(12) United States Patent
Whalley

(10) Patent No.: US 10,123,492 B2
(45) Date of Patent: *Nov. 13, 2018

(54) CENTER PIVOT IRRIGATION SYSTEM WITH VARIABLE APPLICATION OF WATER UNDER THE CORNER ARM

(71) Applicant: TRIMBLE INC., Sunnyvale, CA (US)

(72) Inventor: Mark Whalley, Christchurch (NZ)

(73) Assignee: TRIMBLE INC., Sunnyvale, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 15/245,428

(22) Filed: Aug. 24, 2016

(65) Prior Publication Data

US 2018/0054982 A1    Mar. 1, 2018

(51) Int. Cl.
*A01G 25/09* (2006.01)
*A01G 25/16* (2006.01)

(52) U.S. Cl.
CPC .......... *A01G 25/092* (2013.01); *A01G 25/16* (2013.01); *A01G 25/165* (2013.01)

(58) Field of Classification Search
CPC .... A01G 25/16; A01G 25/162; A01G 25/165; A01G 25/092; B05B 1/20; B05B 1/30; B05B 12/12; B05B 12/124
USPC .................................................. 239/728–731
See application file for complete search history.

(56) References Cited

U.S. PATENT DOCUMENTS

| | | | |
|---|---|---|---|
| 6,036,122 A | 3/2000 | Gerdes et al. |
| 6,666,384 B2 | 12/2003 | Prandi |
| 6,928,339 B2 | 8/2005 | Barker |
| 6,938,842 B2 | 9/2005 | Choat et al. |
| 7,953,550 B1 | 5/2011 | Wieting |
| 8,185,303 B1 | 5/2012 | Wieting |
| 8,494,682 B2 | 7/2013 | Elmer et al. |
| 8,494,763 B1 | 7/2013 | Wieting |
| 8,739,830 B2 | 6/2014 | Bradbury et al. |
| 8,849,468 B2 | 9/2014 | Abts et al. |
| 2002/0066810 A1 | 6/2002 | Prandi |

OTHER PUBLICATIONS

International Search Report for International Application No. PCT/US2017/146006, dated Oct. 12, 2017.

*Primary Examiner* — Alexander Valvis
(74) *Attorney, Agent, or Firm* — Marsh Fischmann & Breyfogle LLP; Kent A. Lembke

(57) ABSTRACT

A center pivot irrigation system adapted for variable depth application of water under the corner sprinkler arm. The system includes a pivot sprinkler arm with a first set of nozzles, and a first set of control valves each provided on the pivot sprinkler arm upstream of a nozzle. The irrigation system includes a corner sprinkler arm pivotally coupled to an end of the pivot sprinkler arm, and the corner sprinkler arm includes a second set of spaced apart nozzles and a second set of control valves. The irrigation system includes a controller transmitting control signals to the first and second sets of control valves to open and close in a pattern that includes a valve pulsing pattern for the corner sprinkler arm, whereby input water is applied at a variable rate under the corner sprinkler arm to apply different depths to various user-defined zones.

10 Claims, 20 Drawing Sheets

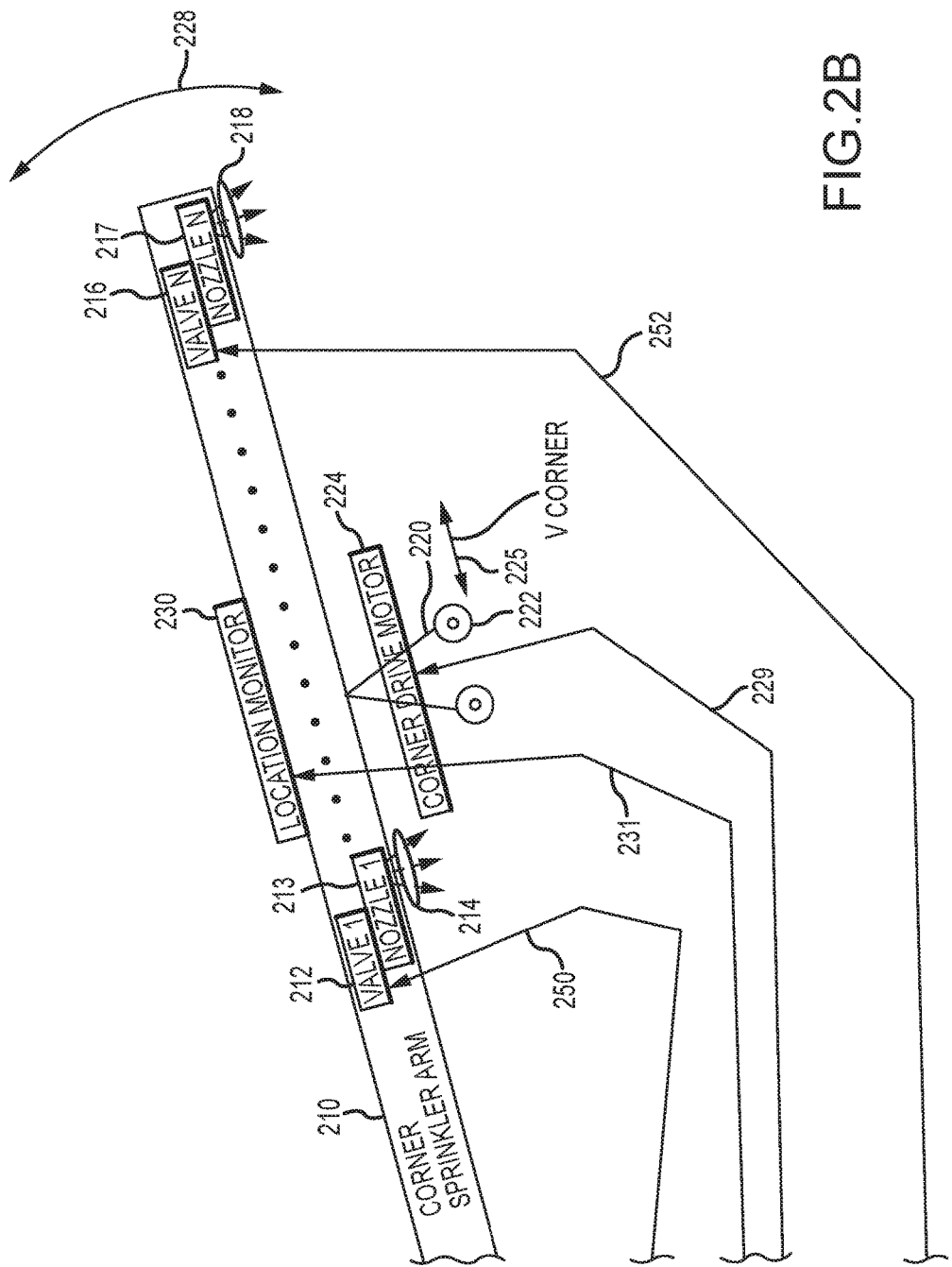

CENTER PIVOT IRRIGATION SYSTEM WITH VARIABLE APPLICATION OF WATER UNDER THE CORNER ARM

BACKGROUND

1. Field of the Invention

The present invention generally relates to systems and methods for controlling operation of a center pivot irrigation system and, more particularly, to a center pivot irrigation system with a corner arm that is configured to provide, with the irrigator's corner arm nozzles (e.g., drop nozzles), a variable (or user-selectable) depth of water application in differing zones of land irrigated by the corner arm (e.g., variable rate irrigation (VRI) under the corner arm).

2. Relevant Background

In many areas of the world, the agricultural industry relies upon effective irrigation to raise crops. Irrigation may be used due to limited rainfall or rainfall that is not adequate for a particular crop. Further, irrigation may be utilized due to the variability in the timing of rainfall as many crops require a relatively consistent amount of water over their growing period.

Center pivot irrigation is one of the most water-efficient irrigation techniques. Center pivot irrigation is a form of overhead sprinkler irrigation that makes use of a long sprinkler arm formed of several segments of pipe joined together and supported by trusses. The pipe segments are mounted on wheeled towers each typically driven by an electric motor. Sprinklers or sprinkler heads are spaced apart along the length or span of the sprinkler arm. The sprinkler arm is centrally anchored such that the sprinkler arm moves in a circular pattern, and water is fed into the sprinkler arm at the center of the circle via one, two, or more pumps that may be positioned anywhere between the sprinkler arm and a water source such as an aquifer.

The outside set of wheels on the arm may set the master pace for the rotation such as once every three days. The inner sets of wheels can be mounted at hubs or towers between two pipe segments, and angle sensors can be used to detect when the bend at the joint between the two segments exceeds a certain maximum threshold as an indication of when the electric motor driving the inner wheel sets should operate to rotate these wheels to keep the pipe segments generally aligned along the arm span. Center pivot sprinkler arms are typically less than about 1600 feet (or 500 meters) in length (i.e., irrigated circle radius) with a common size being 1320 feet (or a quarter mile or 400 meters) length or circle radius, but many pivot sprinkler arms may be much longer than 500 meters in length.

Most center pivot irrigation system use sprinklers that hang down from the sprinkler arm pipe segments so that the sprinkler heads are positioned a few feet above the ground or crop so as to limit evaporative losses and wind drift. There are many different sprinkler head or nozzle configurations that may be used including a static plate, a moving plate, and so on with a rotator-style pivot applicator sprinkler head or nozzle being one of the more popular in present irrigation systems. The rotator-style sprinkler head or nozzle is adapted to work properly with input water at a particular pressure (or within a desired range and not very well or at all if too far below this pressure), and a pressure regulator may be provided upstream of each nozzle or sprinkler head to ensure that each is operating at the correct design pressure (not over pressurized).

It is typically an operational goal of a center pivot irrigation system to provide uniform application of water, which may include effluent, chemicals, and fertilizers, and to avoid applying too much water in one application (e.g., by running too slowly) so as to reduce run-off and leaching. To achieve such uniform application, the center pivot irrigation system generally requires an even emitter flow rate across the length or span of the sprinkler arm. Since the outer-most pipe segments and wheeled towers travel farther in a given time period (e.g., at a higher speed) than the inner-most pipe segments and wheeled towers, nozzle sizes may be smallest at the inner spans and increase in size with distance from the pivot point such that a greater flow of water is output at positions on the sprinkler arm that is moving the fastest (and a lower flow of water is output at positions on the sprinkler arm that is moving the slowest).

While center pivot irrigation systems are considered to be highly efficient systems that are useful in conserving water, there remains a number of challenges associated with their use to irrigate crops. One challenge is that center pivot irrigation systems may also include a corner sprinkler arm (or corner arm extension system) extending outward from the last regular drive of the pivot sprinkler arm, and it can be difficult to provide uniform application of water from the corner sprinkler arm. The last regular drive and/or tower provides the final set of drive wheels at the outer most point of the pivot sprinkler arm (e.g., a point in the pipe section or span that is most distal to the center point or rotation axis), and the corner sprinkler arm (or corner arm section) is a section of pipe that has a steerable set of wheels enabling it to trail behind the main pivot pipe or pivot sprinkler arm or to swing out so as to extend the effective length (or radius) of the center pivot irrigation system. The use of corner sprinkler arms is desirable as it enables the irrigation system to irrigate into the corners of a field (e.g., irrigate a more square geographic area) rather than just irrigating a circular portion of the field.

The use of a corner sprinkler arm in a center pivot irrigation system can be problematic because the corner sprinkler arm typically will not provide very good uniformity of depth of application during irrigation operations. As discussed above, uniform depth is important to farmers to achieve consistency of crop growth across their irrigated fields. Non-uniformity results because as the corner sprinkler arm is opening up (its outer end is swung out relative to the last regular drive), the end of the corner sprinkler arm at the outermost extent of irrigation must travel at a speed that is much faster than the last regular drive. Also, as the corner sprinkler arm is falling back behind the main part of the pivot sprinkler arm, the outer end of the corner sprinkler arm must travel at a speed that is much slower than the last regular drive of the pivot sprinkler arm. Conversely, the opposite is true when the irrigation system is running in a reverse direction.

The speed that nozzles on the corner sprinkler arm travel over the ground is directly correlated with the depth of the application of water. For example, a nozzle will apply less water to the ground when the corner sprinkler arm is opening up and traveling faster when compared with the same nozzle traveling more slowly as it is falling back or is trailing behind the last regular drive of the pivot sprinkler arm. To further complicate the problem of non-uniformity of application, the position of nozzles differs between irrigation systems designed and/or manufactured by different companies as does the actual path the corner arm follows during irrigation processes. As a result, each nozzle of a corner sprinkler arm of each irrigator system can have its own unique acceleration and deceleration profile. Another problem with providing uniform application with a corner sprinkler arm is that the same piece of land (or portion of an irrigated field) may be affected by two or more nozzles passing over it, with each at the same or different flow rates and/or speeds.

Center pivot irrigation system manufacturers have attempted to address the non-uniformity problem associated with corner sprinkler arms by turning off banks of nozzles depending on the bearing or present location of the pivot sprinkler arm in a field. For example, banks of four nozzles each may be turned off in the corner sprinkler arm. However, this and other approaches to improve control of the irrigation system have not proven effective and do not tend to provide good uniformity (or acceptable uniformity) in water application by center pivot irrigation systems with corner sprinkler arms. Hence, there remains a need for an improved control method for operating such center pivot irrigation systems (and irrigation systems incorporating such a control method) to provide more uniform application of water (and other liquids/materials such as fertilizer) on portions of fields watered or affected by the corner sprinkler arm.

SUMMARY

Briefly, a center pivot irrigation system is described that includes a controller (e.g., hardware and software for controlling operations of the system) that operates to pulse control valves for the nozzles/sprinkler heads on and off as the main pivot sprinkler arm rotates in the field. Additionally, the controller pulses control valves for the nozzles/sprinkler heads on and off in a corner sprinkler arm extending out from an outer end of the main pivot sprinkler arm in a trailing state when at edges of the field and in an extended state when at corners of the field. The valve open/close pattern along the span or length of the corner sprinkler arm is chosen during each operating cycle (e.g., each valve duty cycle such as a time period in the range of 20 to 90 seconds or the like) such that, in a first useful embodiment of the controller and its software/programming, the nozzles/sprinkler heads of the corner sprinkler arm provide a uniform depth of water application in the portions of the field affected by the corner sprinkler arm.

To this end, a plurality of valve open/close patterns are defined for the corner sprinkler arm with one pattern for each of its locations and orientations during irrigation operations as it travels about the field with the pivot sprinkler arm, and each of these patterns is associated with a bearing of the pivot sprinkler arm. A controller is used to process data from a location monitor on the pivot sprinkler arm to determine its present bearing and, in response, to select a proper open/close pattern for the corner sprinkler arm and generate control signals to the control valves of the corner sprinkler arm to open/use the appropriate set of nozzles/sprinkler heads during the next valve duty cycle to provide uniform application of the input water in this first embodiment of the controller or operating state irrigation system (e.g., uniform application operating state for the irrigation system).

More particularly, a center pivot irrigation system is provided that is specially adapted for more uniform application of input water on a field and, particularly, with an included corner arm pivotally coupled to an end of the main pivot arm. The system includes a pivot sprinkler arm including a first set of spaced apart nozzles. The irrigation system also includes a plurality of towers supporting the pivot sprinkler arm, and drives are provided on the wheeled towers to drive wheels on the towers to rotate the pivot sprinkler arm about a center pivot axis. In the irrigation system, a water supply is used to provide input water to the pivot sprinkler arm. Further, the system includes a first set of control valves each provided on the pivot sprinkler arm upstream of a nozzle in the first set of spaced apart nozzles.

Additionally, the irrigation system includes a corner sprinkler arm pivotally coupled to an end of the pivot sprinkler arm distal to the center pivot axis. The corner sprinkler arm includes a second set of spaced apart nozzles, a corner arm tower supporting the corner sprinkler arm with a drive on the corner arm tower to drive wheels on the corner arm tower to selectively place the corner sprinkler arm in a trailing position, in an extended position, and positions between the trailing position and the extended position, and a second set of control valves each provided on the corner sprinkler arm upstream of a nozzle in the second set of spaced apart nozzles. The irrigation system includes a controller running a valve operation module that transmits control signals to the first and second sets of control valves to open and close in a pattern defined by a valve pulsing pattern for the pivot sprinkler arm and a valve pulsing pattern for the corner sprinkler arm. In some situations, it may be desirable and/or useful to utilize multiple controllers. For example, two controllers may be provided in the system when there are more than 250 (or some other maximum number) or more valves. As discussed below, the corner system may be used in exclusion of valves on the first set of nozzles, e.g., a farmer may want uniformity on the corner but may not need valves on the main pivot sections to achieve this water application goal.

In some implementations of the irrigation system, the control signals are transmitted at the beginning of each valve duty cycle, and the valve duty cycles are equal time periods in the range of 20 to 90 seconds. In such implementations, the valve pulsing pattern for the corner sprinkler arm typically differs for at least a subset of the valve duty cycles (e.g., may be repeated for two or more cycles but then will change over to a new and different pattern of open/closed valves to use differing nozzles to apply water with the corner sprinkler arm).

In the same or other implementations of the irrigation system, a location monitor is provided that periodically determines a bearing of the pivot sprinkler arm (e.g., relative to the center pivot axis). In such cases, the valve pulsing pattern for the corner sprinkler arm is selected by the valve operation module based on the bearing of the pivot sprinkler arm. Further, the valve pulsing pattern for the corner sprinkler arm can be selected based on the bearing from a plurality of differing predefined open and closed patterns for valves on the corner sprinkler arm each associated with a different bearing of the pivot sprinkler arm. Additionally, the plurality of differing predefined open and closed patterns for the valves on the corner sprinkler arm can be adapted or designed to provide a uniform application of the input water from the second set of spaced apart nozzles of the corner sprinkler arm as the pivot sprinkler arm rotates about the center pivot axis with the water supply providing the input water.

Still further, the plurality of differing predefined open and closed patterns for the valves on the corner sprinkler arm can be generated from a simulation of travel of the pivot sprinkler arm and the corner sprinkler arm along a travel path in a field during irrigation operations of the field. In such cases, the simulation may include measuring application of water from both the pivot sprinkler arm and the corner pivot arm into a plurality of grid areas and comparing the measured application of water in the grid areas with a goal depth of irrigation for the field.

It was further discovered by the inventor that there are many irrigation settings where the farmer or user of the irrigation system desires to be able to define two or more zones of uniform application under the corner pivot arm. Each of these zones may be defined by the farmer or user of the irrigation system to have a particular depth of application (or application depth) such as zero or no application where a road is located, to have a first lower depth under areas where the soil retains water better or the crops need less water, to have second higher depth under areas where the soil is more sandy or does not retain water as well as the other zones or the crops planted in these areas require more water, and so on. The irrigation system described herein is adapted to provide these "controlled variable application depth zones" and no spray zones (or zero depth zones) to a center pivot irrigation system with uniformity of application of water (or overall application) under the corner arm. Hence, one purpose of the second embodiment of the irrigation system (or its controller or its operating state) is to meet a need where farmers need a uniform application in user-specified zones under the corner arm, where the different zones under the same corner arm each require a different depth of application.

This is achieved for this second embodiment of the controller or the irrigation system by defining a second set or plurality of valve open/close patterns for the corner sprinkler arm with one pattern for each of its locations and orientations during irrigation operations as it travels about the field with the pivot sprinkler arm, and each of these patterns is associated with a bearing of the pivot sprinkler arm. The controller is again used to process data from a location monitor on the pivot sprinkler arm to determine its present bearing and, in response, to select a proper open/close pattern for the corner sprinkler arm from this variable application depth set and generate control signals to the control valves of the corner sprinkler arm to open/use the appropriate set of nozzles/sprinkler heads during the next valve duty cycle to provide variable application of the input water in this second embodiment of the controller or operating state irrigation system (e.g., variable application zone operating state for the irrigation system).

In brief, the first embodiment of the irrigation system determined the valve open/close pattern by simulating the rotation of a pivot along with the movement of the corner arm. By calculating the movement of every nozzle and the volume of water applied from each nozzle, the depth of irrigation is simulated (e.g., by a computing device with software/programming used to generate the valve open/close pattern) that is likely to occur at various pulse rates of a solenoid valve. The simulated depth of irrigation is added to the grid, with each square in the grid representing an area of land under the irrigator (e.g., under the corner arm). In this first embodiment, a pulse rate of adding water to the grid is selected for each valve for each minute of each degree of rotation to meet a prescribed application depth (e.g., prescribed by an irrigation depth map or plan provided by the user (e.g., farmer)). This method of defining the valve open/close patterns allows a controller to operate the sprinkler system so as to produce a uniform application rate under the entire span of the corner arm at a single application depth.

In contrast, the second embodiment of the irrigation system described herein adds a second application depth prescription grid to the pattern definition process. The second prescription grid (or variable application depth grid) is of the same granularity as the grid in the uniform corner system. The second grid is a prescription of goal depths enabling a controlled variable depth application under the corner pivot arm. The pattern defining method/process involves, when deciding the pulse rate for each valve for each minute of each degree of rotation, comparing the cells in the simulated application grid to the cells in the second grid (or prescribed depth grid) rather than to a single prescribed application depth for the entire corner pivot arm. Hence, the second embodiment of the irrigation system differs from the first irrigation system at least because it involves the creation of the prescription grid and includes comparison of each grid square or cell to its partner (corresponding cell) in the prescription grid rather than comparison to a single goal depth.

BRIEF DESCRIPTION OF THE DRAWINGS

FIGS. 2A and 2B in combination provide a functional block diagram or schematic of a center pivot irrigation system of the present description with a corner sprinkler arm along with the conventional pivot sprinkler arm, with the system memory storing (e.g., with elements 168 and 169) data on a collection of valves/nozzles each with a design flow rate, ordinal location, and distance from center and last regular drive or end of the pivot sprinkler arm (to triangulate actual position);

DETAILED DESCRIPTION

Figure 1:
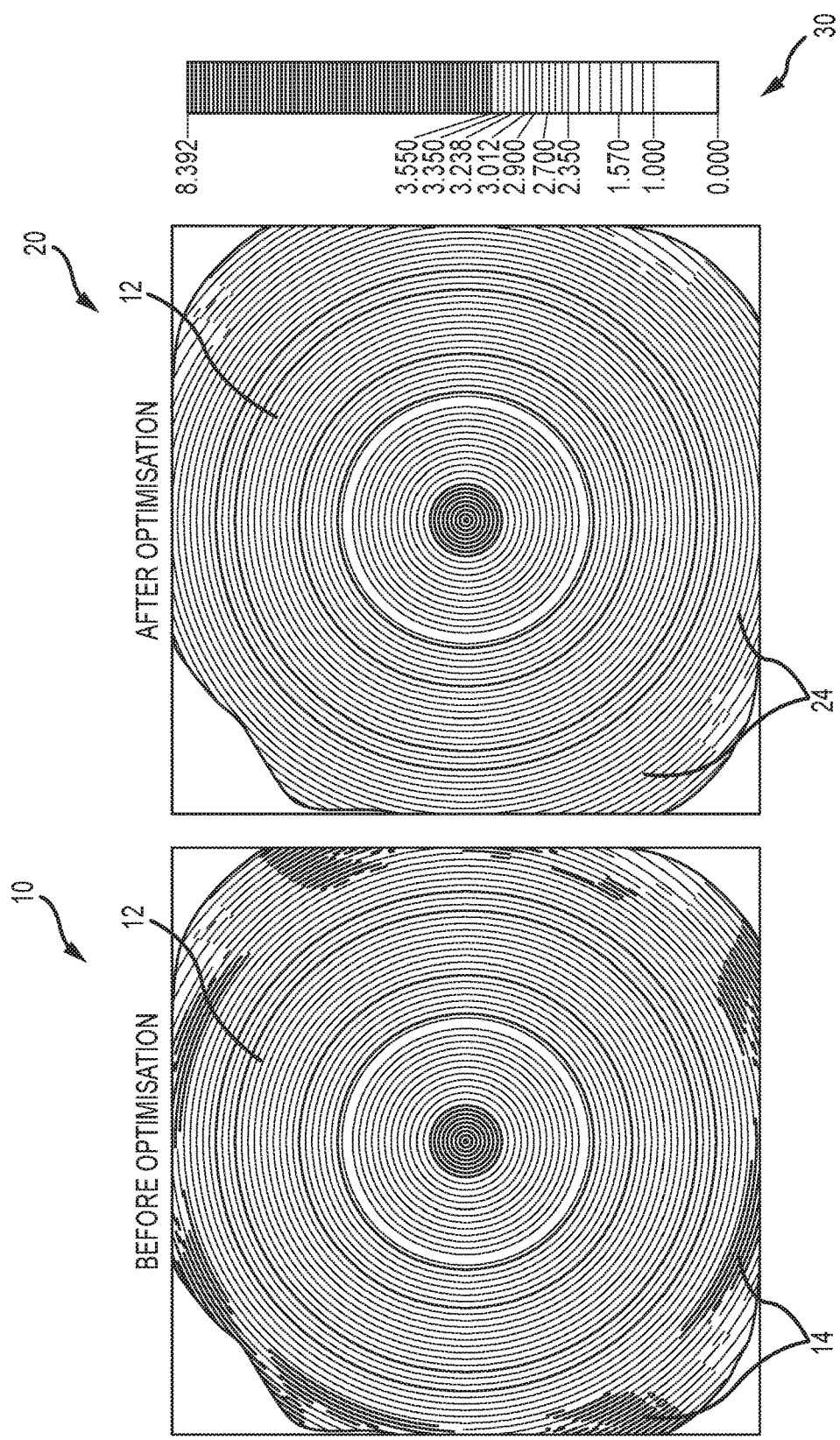
FIG. 1 illustrates a pair of graphs illustrating depth of application provided for a field irrigated without and with the control methods described herein using a center pivot irrigation system with a corner sprinkler arm.

The following describes a center pivot irrigation system with a corner sprinkler arm, and the irrigation system includes a flow controller (or water flow controller) that is specially adapted to effectively control operations of the corner sprinkler arm to, in a first embodiment or operating mode/state, more uniformly apply water to an irrigated field (e.g., to the corners of the field watered by the corner arm and nearby affected areas) and to, in a second embodiment or operating mode/state, uniformly apply water at variable rates in different zones specified by an irrigation plan (by the farmer/user) under the corner arm. In the first and second embodiments or operating mode/states, the control method provides control over uniformity and variable depth application by measuring and using position information for the corner sprinkler arm and individual nozzles (or sprinkler heads) such as by using position sensors on the pivot sprinkler arm and/or corner sprinkler arm (e.g., global position satellite (GPS) sensors or the like). The control method involves individual control over each nozzle based on a nozzle open/close pattern (or customized valve pulsing profile) that is used to generate control signals for control valves (e.g., solenoid valves) provided upstream of each of the nozzles/sprinkler heads.

The nozzles are pulsed open and closed for each duty or service cycle of the irrigation system (e.g., a cycle of once every 20 to 90 seconds or the like with 30 second cycles used in some embodiments) based on the valve pulsing profile to create multiple effective flow rates for each nozzle, and these flow rates may differ for each nozzle along the corner sprinkler arm. The inventor recognized that it may be useful to provide improved application control by simulating the center pivot irrigation system's characteristics in software including the speed of the corner sprinkler arm, the movement of the corner arm, the position, flow rate, and throw radius of each nozzle/sprinkler head in the corner arm. This simulation can then be used to calculate a valve pulsing profile (or nozzle open/closed pattern) that is optimized for uniformity of application depth in a first embodiment or operating mode/state and for variable application in user-defined zones in a second embodiment or operating mode/state.

The following description will initially discuss the first embodiment (uniform depth) with regard to FIGS. 1-6 and then move on to discussion of the second embodiment (variable depth application), which may involve minor modifications/changes of FIGS. 1-6 (such as by causing the valve operation module 156 to choose valve open/close patterns for the corner arm 280 (based on a present pivot arm location/bearing 266) that are defined as described herein for achieving uniform application in two or more zones of land under the corner arm, with each zone having a user-defined application depth that can differ and be individually set).

Briefly, though, the second embodiment adds the capability for variable depth of application to the uniform corner program (first embodiment). The inventor discovered that changes to the irrigation system of the first embodiment (uniform flow under the corner pivot arm) allows the irrigation system of the second embodiment to implement a variable depth of application with the controller. In the uniform depth corner system (first embodiment), a grid was created of same-sized squares (or other shaped cells), where each cell or square represented part of the land under the corner arm pivot. For example, the cells may be half a meter by half a meter, and, in a half mile pivot, there will be a small amount over ten million cells in the grid. A typical nozzle spraying a circle pattern in one spot will hit or spray onto about 422 cells.

The uniform system or first embodiment simulates a pivot moving over the land as well as the continually changing position of each nozzle on the corner pivot arm as it accelerates and decelerates into and out of each corner of the field. During this simulation, the method of the first embodiment determines for each nozzle for each position of the pivot how much water would land in each cell/square of the grid if the nozzle were spraying at that time. A single predetermined depth (the uniform depth target) value is compared against every grid cell affected by a nozzle at each position. If a certain number of cells at that position would get too much water (e.g., a small number may be useful such as 2 out of 422 cells) then the nozzle will not be allowed to spray (or be open in the pattern).

In the variable application depth zone or second embodiment, instead of having a single predetermined depth, a grid of target depths is created. Each cell potentially has a different depth but, in practice, groups of cells associated with relatively large polygonal areas (e.g., particularly within each corner of a field) of an irrigation plan typically have matching application depths. The target or prescription grid has the same granularity as the simulation grid (discussed with reference to the first embodiment/uniform depth control method). In one example, the cells of the grid are half meter squares at a half mile (or 800 meter) radius for a center pivot irrigator, which results in over ten million cells/squares. Use of such a prescription grid allows the second embodiment of the control method (or operating state of the irrigation system or at least its controller) to provide control over the variation in the depth that is targeted across the land under the pivot corner arm by applying different target depths in each cell of the target depth or prescription grid. The control processes of the first embodiment or irrigation system act to work with this new prescription grid when the valves associated with each nozzle in the pivot or corner sprinkler arm should be open or closed and at what frequency each of these valves should pulse, with the new features of the second embodiment including generating the target depth or prescription grid and the change to the valve open/close pattern generation process of comparing against the correct selection of cells in the target depth or prescription grid (instead of to a single fixed value).

FIG. 1 illustrates a first graph 10 showing (based on legend 30) water application before the present control method (or optimization for uniformity) is applied. As shown, application is relatively uniform in the inner circular area 12 of the field that is under the nozzles/sprinkler heads of the main pivot sprinkler arm but is non-uniform outside this area 12 with areas 14 showing areas where over irrigation is a problem. The graph 10 may correspond with a simplistic control technique where valves associated with nozzles in the corner arm are all turned off or closed when the corner arm is tucked in or trailing the last regular drive (or outermost end) of the pivot sprinkler arm such as near the edges of the field rather than in the corners.

In contrast, the first embodiment of the control method of the present description (or optimization for uniformity of application in the corner arm) is applied for the application graph 20. As shown, uniformity is retained in the center area 12. Further, though, uniformity is achieved in some of the areas 24 where it had proven problematic with prior control as shown at 14 in graph 10. As these diagrams/graphs 10, 20 show, over irrigation can be solved using the present control method for a center pivot irrigation system with a corner sprinkler arm. Note, though, under irrigation may be unaffected or less improved because the control method restricts the flow rate through valves in the corner sprinkler arm but cannot make more water flow through the pivot irrigation system.

Figure 2A:
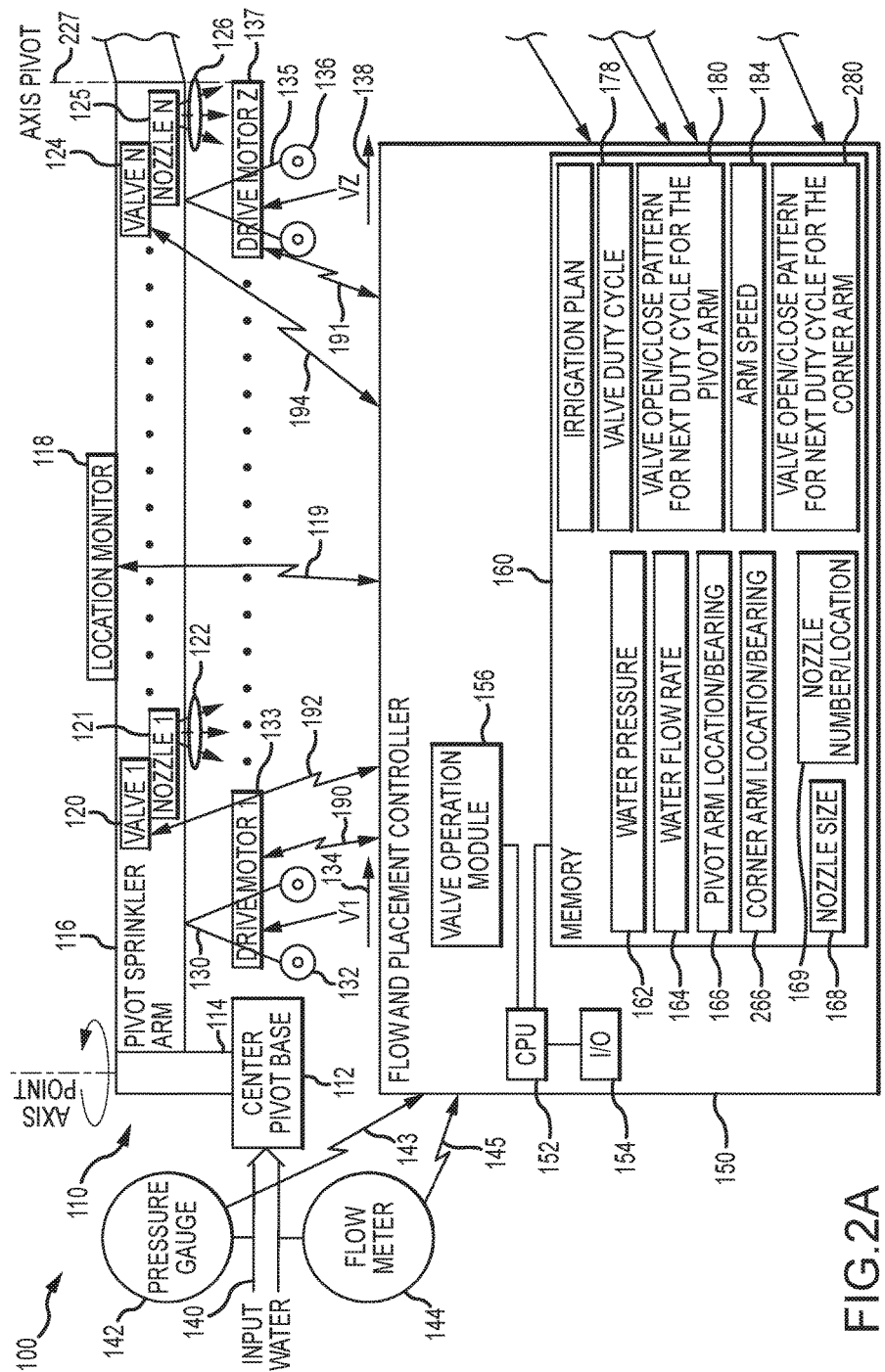
Figure 6:
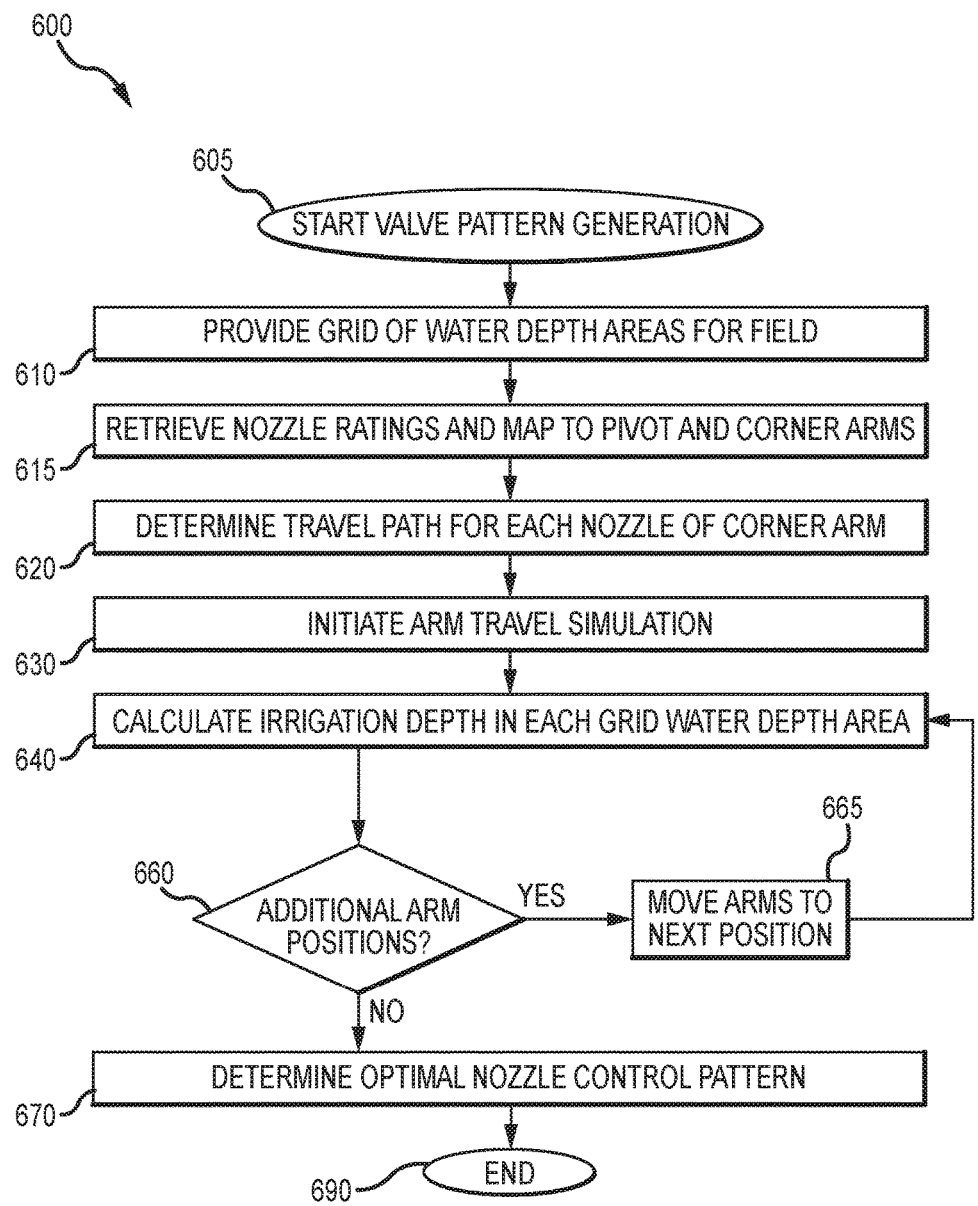
FIG. 6 is a logic flow diagram or algorithm for generating a valve pulsing pattern for use with at least the valves used to control flow to nozzles/sprinklers of a corner arm of a center pivot irrigation system.

FIGS. 2A and 2B illustrate a center pivot irrigation system 100 that is configured to implement the control methods or techniques (first and second embodiments) described herein to provide uniform placement with combined use of a pivot arm and a corner arm and to also provide, as discussed after FIG. 6, variable rate application under the corner arm (e.g., differing levels of irrigation in predefined zones, which may include no water zones).

As shown, the irrigation system 100 includes a pivot irrigator (or sprinkler arm assembly) 110 that includes a center pivot base 112 upon which a pivot hub 114 is pivotally mounted. A pivot sprinkler arm 116, which typically would include a number of interconnected pipe segments, extends outward a distance such as 300 to 500 meters or the like. The pivot sprinkler arm 116 is supported by a number of towers 130, 135 that include a set of wheels 132, 136 and that are driven at a rotation or arm speed as shown with arrows 134, 138 (and as $V_1$ and $V_Z$) by separately operable electric drive motors 133, 137. Typically, the outermost drive motor 137 (or "last regular drive" or last tower 135 with last set of wheels 136) is used to pace rotation of the arm 116 about the pivot axis, $Axis_{Point}$, with the inner drive motors 133 operating to maintain alignment of the various pipe segments of the arm 116. During irrigation operations, input water 140 is pumped or otherwise provided to the sprinkler arm 116 via the base 112 and hub 114 such as at a flow rate ranging from 400 gallons per minute (GPM) or less up to 2000 GPM or more. The input water flow rate typically is relatively constant for periods of time during a growing season but will typically vary at least periodically, e.g., vary from about 600 GPM at the beginning of a growing/irrigation season and then drop to 400 GPM toward the end of the growing season as the amount of water available for irrigation decreases.

The irrigation system 100 further includes a flow controller 150 to monitor and control operations of the pivot irrigator 110 and its nozzles 121, 125 via the control valves 120, 124 and the drive motors 133, 137. The controller 150, which may take the form of a desktop, laptop, tablet, irrigation system controllers (e.g., irrigation controller electronics presently commercially available or designed in the future modified to provide the functionality described herein), or other computing device, includes one or more processors 152 that manage and/or operate input and output devices 154, which may be used to allow an operator to input and view data (such as via a keyboard, touchscreen, mouse, monitor, and the like). The I/O devices 154 also are used to provide wired or, more typically, wireless communications with the pivot irrigator 110 and its components.

Particularly, as shown in FIGS. 2A and 2B, the controller 150 operates to receive data from a pressure gauge 142 and from a flow meter 144 via wired/wireless signals 143, 145, and the controller 150 manages memory/data storage devices 160 to store the measured water pressure 162 and water flow rate 164 of the input water 140. Further, the pivot irrigator 110 includes a location monitor 118, such as a Global Navigation Satellite System (GNSS) receiver, Global Satellite Position (GPS) receiver/device or the like, that operates to gather location data (e.g., latitude and longitude information) for the sprinkler arm 116 that is transmitted in communications/signals 119 to the controller 150. For example, the location monitor 118 may be positioned at the outer end of the arm 116 distal to the center pivot base 114 and proximate to the last regular drive 137/tower 135 and be operated to obtain a present bearing (or angular orientation) of the pivot arm 116 during its use to irrigate a field. The processor 152 acts to at least temporarily store this arm location data (or pivot arm bearing) 166 in the memory 160.

Further, the I/O devices 154 are operated by the processor 152 to transmit control signals to the drive motors 133, 137 as shown at 190, 191 and to the individual control valves 120, 124 for the nozzles 121, 125 as shown at 192, 194. In some cases (e.g., in a system 100 with a smart pivot 110), the controller 150 may ask the pivot's own controller (not shown in FIGS. 2A and 2B) to make a certain velocity while in other cases, as shown, the controller 150 signals 190, 191 the motors 133, 137 only (and the motors 133, 137 drive themselves as discussed above).

The controller 150 also operates to execute or run software code/programs to provide a valve operation module 156 that operates, as discussed further herein, to process the irrigator monitoring data 162, 164, 166 and, in response, to generate the control signals 190, 191 to control the speed 134, 138 of the arm 116 and to control which valves 120, 124 are open and which valves 120, 124 are closed during each operating period. The operating period may be labeled a "valve duty cycle" and stored as shown at 178 in the memory 160. The valve duty cycle 178 may be varied to implement the irrigation system 100 with a time period in the range of 20 to 120 seconds typically being useful and with a 30 second time period being used in some of the examples provided herein. Prior to each valve duty cycle (e.g., prior to the next 30 second time period), the valve operation module 156 acts to determine a valve open/close pattern (or valve pulsing schedule) 180 for the valves of the pivot arm 116, and the pattern 180 defines which of the nozzles 121, 126 will be used to discharge 122, 126 the input water 140 (i.e., which valves 120, 124 will be controlled via signals 192, 194 to be open along the span of the arm 116) onto the circular area covered by the pivot arm 116.

FIGS. 2A and 2B also show that the irrigation system 100 includes a corner sprinkler arm 210 that is pivotally attached to the outer end of the pivot sprinkler arm 116 so as to selectively pivot about a pivot axis 227 (e.g., extending through the pivotal coupling between the two arms 116 and 210). As with the pivot arm 116, the corner sprinkler arm 210 is supported by one or more towers 220 with drive wheels 222, and a corner arm drive motor 224 is used to rotate the wheels 222 at a particular velocity, $V_{Corner}$, and to cause the arm 210 to swing in and out as shown with arrows 228 so as to trail the end of the pivot arm 116 (e.g., when at edges of a field being irrigated) and to swing out from the end of the pivot arm 116 (e.g., to extend the length of the arm 116 and apply water 140 to corners of a field).

The corner sprinkler arm 210 includes a plurality of valves 212, 216 (e.g., solenoid or other control-type valves) that are each coupled with one or more nozzles/sprinkler heads 213, 217 to selectively open and close the nozzles 213, 217 to release or apply the water 140 over a particular radius of application or coverage radius as shown with arrows 214, 218. A location monitor (e.g., a GNSS or GPS receiver) 230 is used to provide location data via signals 231 to the controller 150 to allow the controller 150 to determine and monitor the bearing or angular orientation 266 of the corner arm 210 relative to the end of the pivot arm 116 during irrigation operations. The controller 150 may transmit control signals 229 to the corner driver motor 224 to adjust the speed, $V_{Corner}$, to follow a desired irrigation pattern for a particular field (e.g., to selectively swing in and out 228 to water a corner or to trail to avoid obstacles at an edge of a field).

Additionally, the controller 150 operates to retrieve a valve open/close pattern 280 (to provide uniform flow for first control embodiment or variable application depths for second control embodiment) for each duty cycle of the irrigation system 100 that is stored in memory 160 and transmit control signals 250, 252 to the valves 212, 216 to selectively pulse the valves 212, 216 open or closed each duty cycle 178. This pattern or valve pulsing schedule 280 is defined for use in operating the valves 212, 216 to open and close the valves 212, 216 in a predefined pattern and at predefined bearings 166 of the pivot arm 116 and present locations/bearings 266 of the corner arm 210. With a proper open/close pattern 280, the nozzles 213, 217 can be operated to apply 214, 218 a uniform depth of the water 140 onto the field under the corner arm 210 (or a variable depth in differing zones according to the second embodiment) as well as portions also covered by the pivot arm 116, as the corner arm nozzles such as nozzle 213 may overlap with coverage radii of nozzles/sprinkler head on the pivot arm 116 such as outer nozzles including nozzle 124 on the pivot arm 116. The following description provides a detailed explanation of the logic and/or algorithms used to generate an open/close pattern or pulsing schedule 280 for a corner arm 210 and the benefits of implementing such a control process in a controller 150 of a center pivot irrigation system 100.

Figure 3:
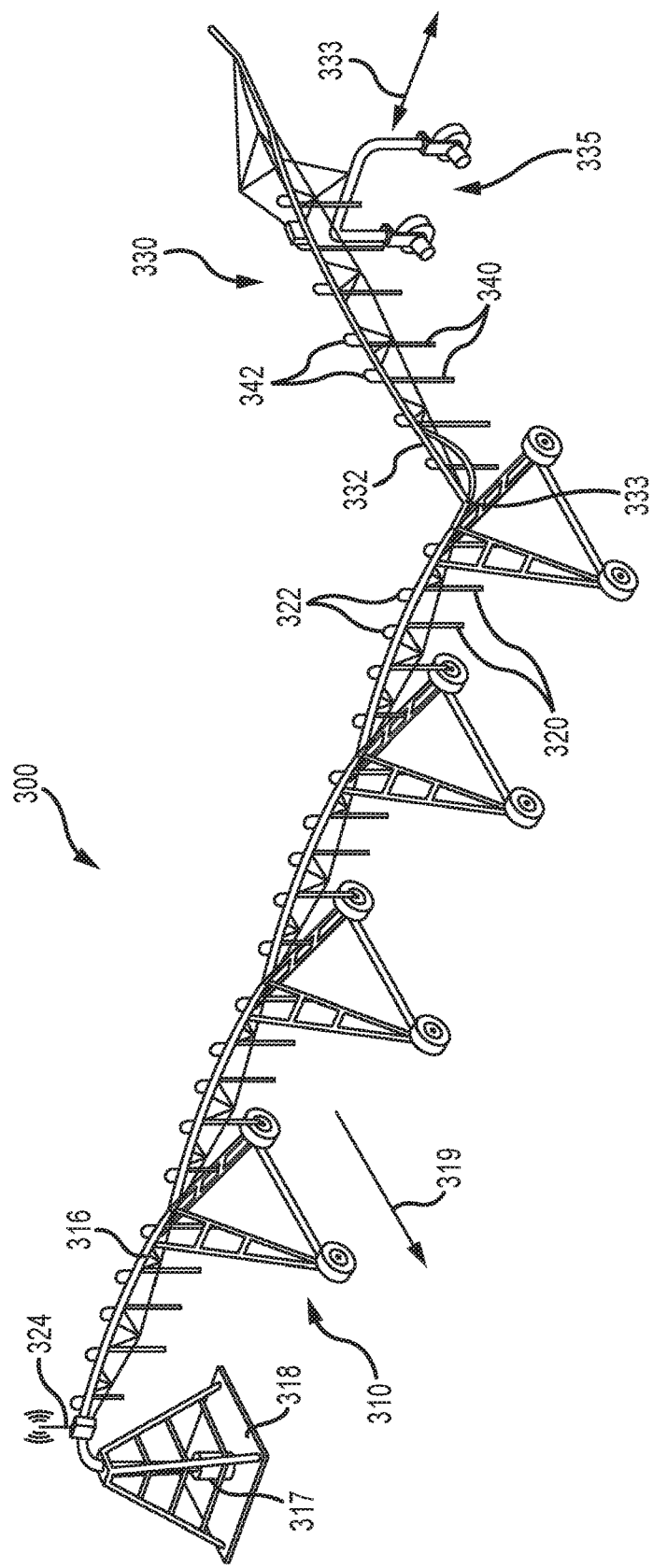
FIG. 3 illustrates a top perspective view of a center pivot irrigation system that may be used to implement all or portions of the system of FIG. 2.

FIG. 3 illustrates a top perspective view of a center pivot irrigation system 300. The irrigation system 300 includes a pivot arm assembly 310 with a pivot arm 316 extending outward from a center pivot base 318, and the drives of the pivot arm assembly 310 are operated to cause the pivot arm 316 to pivot or rotate 319 about the pivot base 318. A positive displacement or other type of pump 317 is provided at the base 318 to pump input water into the pivot arm 316. The pivot arm 316 includes a plurality of drop down nozzles/sprinklers 320 spaced apart along the length of the arm 316, and a solenoid valve 322 is provided on every sprinkler 320 to provide independent control of each sprinkler 320 with valve controller 324, e.g., to provide uniform flow over the circular area covered by the pivoting 319 arm 316 (note that pulsing of valves over the main pivot arm (or inner circle) typically is not needed to achieve uniformity as the variation in selection of sprinkler sizes can do this as described, but corner nozzle pulsing is used to achieve uniformity (in the first embodiment or operating state) or variable rate or depth application (in the second embodiment or operating state) in the corner pivot arm (while the main nozzle valves are used for VRI or to keep uniformity when a variable speed is applied)).

The irrigation system 300 further includes a corner arm assembly 330 with a pipe/arm 332 pivotally coupled at a first end 333 to the end of the pivot arm/piping 316. This pivotal coupling allows the drive(s) on the wheels of the tower assembly 335 to cause the corner arm 332 to accelerate/decelerate to swing inward to trail the end of arm 316 or to swing outward to extend the arm 316 as shown with arrows 333. Like the pivot arm 316, the corner arm 332 includes a plurality of spaced apart drop down nozzles/sprinklers 340 that are each independently controlled or operated by solenoid or other control valves 342 that are opened and closed in a pulsed manner during movements 333 of the corner arm 330 such as by valve controller 324 to provide, in a first embodiment or operating state, uniform depth application or to provide, in a second embodiment or operating state, variable depth application of water provided by pump 317 on land underneath the corner arm 332 (or its sprinklers 340).

Figure 4:
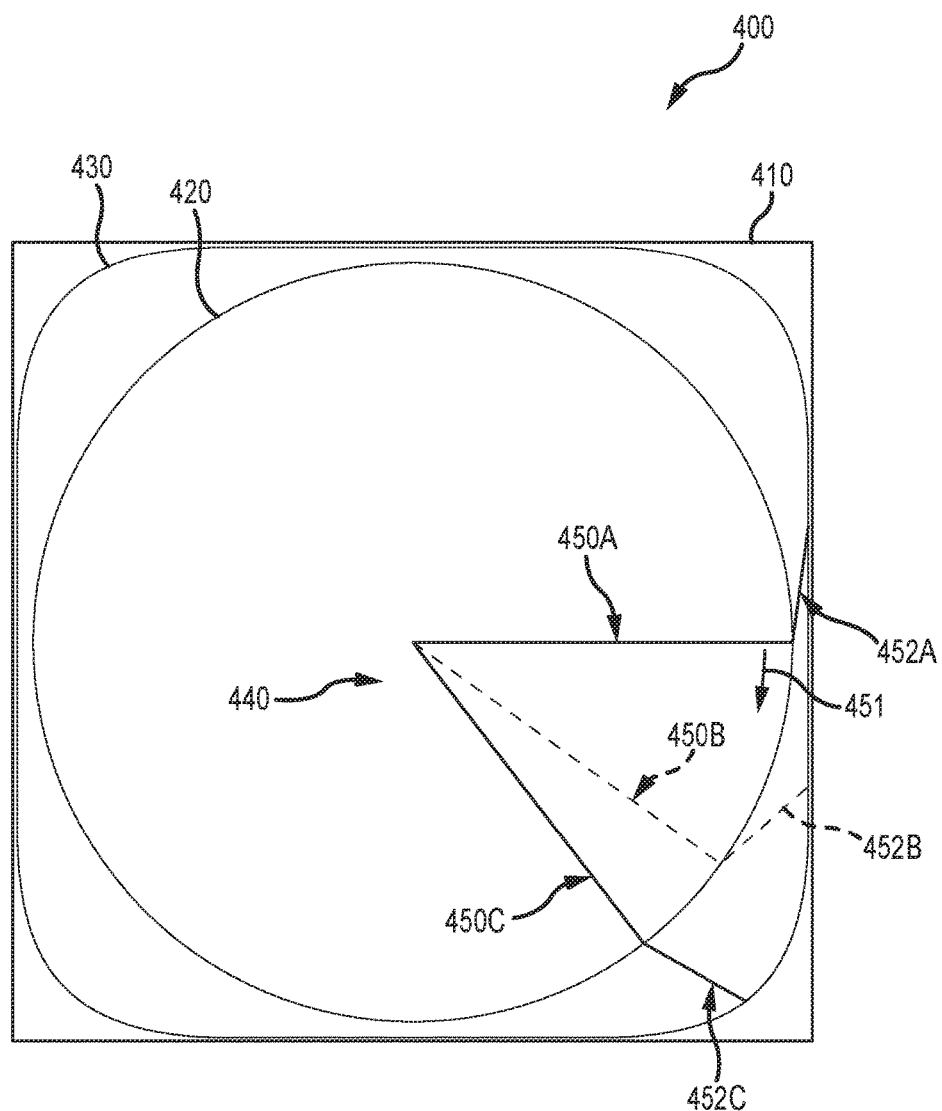
FIG. 4 illustrates an irrigation diagram for a field implementing the valve control method described herein and as may be provided by operation of the irrigation systems of FIGS. 2 and 3.

FIG. 4 illustrates an irrigation diagram 400 for a field 410 implementing the valve control method described herein and may be provided by operation of the irrigation systems 200 and 300 of FIGS. 2 and 3. As shown, a center pivot irrigation system 440 is operable to irrigate a circular area 420 such as with its center pivot base in the center of the square-shaped field 410. Through the use of corner arm, though, the irrigation system 440 is operable to irrigate a larger, near-square area 430, e.g., with the corner arm used to apply water in a relatively uniform manner (in a first embodiment) or in a variable depth manner to user-defined zones (in a second embodiment) to corners of the field 410 outside the circular area 420.

In a first operating state, the pivot arm 450A is operated (via valve control according to an open/close pattern for the pivot arm at a particular pivot arm bearing) to irrigate the center area 420 while moving 451 about its center pivot axis. The bearing of the arm 450A places the end of the arm 450A at or near the edge of the field 410. With this pivot arm bearing, the corner arm 452A is operated to be positioned in a trailing position (or state) relative to the outer end of the arm 450A. Further, though, the valves of the corner arm 452A are operated to be open or closed according to a pulsing schedule or open/close pattern particular to the corner arm 452A that is suited to the bearing of the pivot arm 450A and the trailing state or bearing/orientation of the pivot arm 452A (such as with most or many of the valves closed) to selectively discharge a desired amount of water on the narrow edge/portion of the field 430 being watered by the corner arm 452A.

At a later point in time during the operations of the irrigation system 440, the pivot arm 450B has rotated/moved 451 to a second bearing/location and is being controlled (valve controlled) to irrigate a different portion of the center area 420 of the field 410 according to a second open/close pattern selected for this duty cycle. Based on the new pivot arm bearing/location, the corner arm 452B is operated in a second state to be swung outward (at least partially) from the end of the pivot arm 450B to have a second bearing/orientation relative to the end of the pivot arm 450B and move its nozzles/sprinklers over a larger portion of the field 410 not watered by the pivot arm 450B (e.g., a larger portion of a corner of the field 410 in rectangular area 430). In this second orientation, the corner arm 452B is operated such as with a flow or valve controller to have its valves pulsed open and closed according to a second pulsing schedule or open/close pattern chosen specifically for the bearing/location of the pivot arm 450B for a particular duty cycle to achieve more uniform water application (in a first embodiment) or to achieve variable depth application in user defined zones (in a second embodiment). For example, the arm 452B may be accelerating from its trailing position and have more of its nozzles/sprinklers over areas not covered by the pivot arm 450B such that it may be desirable to pulse more of the valves to their open positions with the pivot arm 450B at this bearing to more uniformly apply a depth of water on the field 410 or to apply user-defined depths in various user-defined irrigation zones under arm 452B.

Further, at an additional later point in time during the operations of the irrigation system 440, the pivot arm 450C has rotated/moved 451 to a third bearing/location and is being controlled (valve controlled) to irrigate a different portion of the center area 420 of the field 410 according to a third open/close pattern selected for the present duty cycle. Based on the new pivot arm bearing/location, the corner arm 452C is operated in a third state to be swung outward (e.g., to its fullest extent) from the end of the pivot arm 450C to have a third bearing/orientation relative to the end of the pivot arm 450C and move its nozzles/sprinklers over a larger portion of the field 410 not watered by the pivot arm 450C (e.g., an even larger portion of a corner of the field 410 in rectangular area 430). In this third orientation, the corner arm 452C is operated such as with a flow or valve controller to have its valves pulsed open and closed according to a third pulsing schedule or open/close pattern chosen specifically for the bearing/location of the pivot arm 450C for a particular duty cycle to achieve more uniform water application or, if operating according to the second embodiment, to achieve uniform but differing depths of water application in two or more zones in the areas 430 of the field 410. For example, the arm 452C may be moving at its maximum speed/acceleration and have all or more of the valves pulsed open compared with the arm 452B operating in the second operating state.

Figure 5:
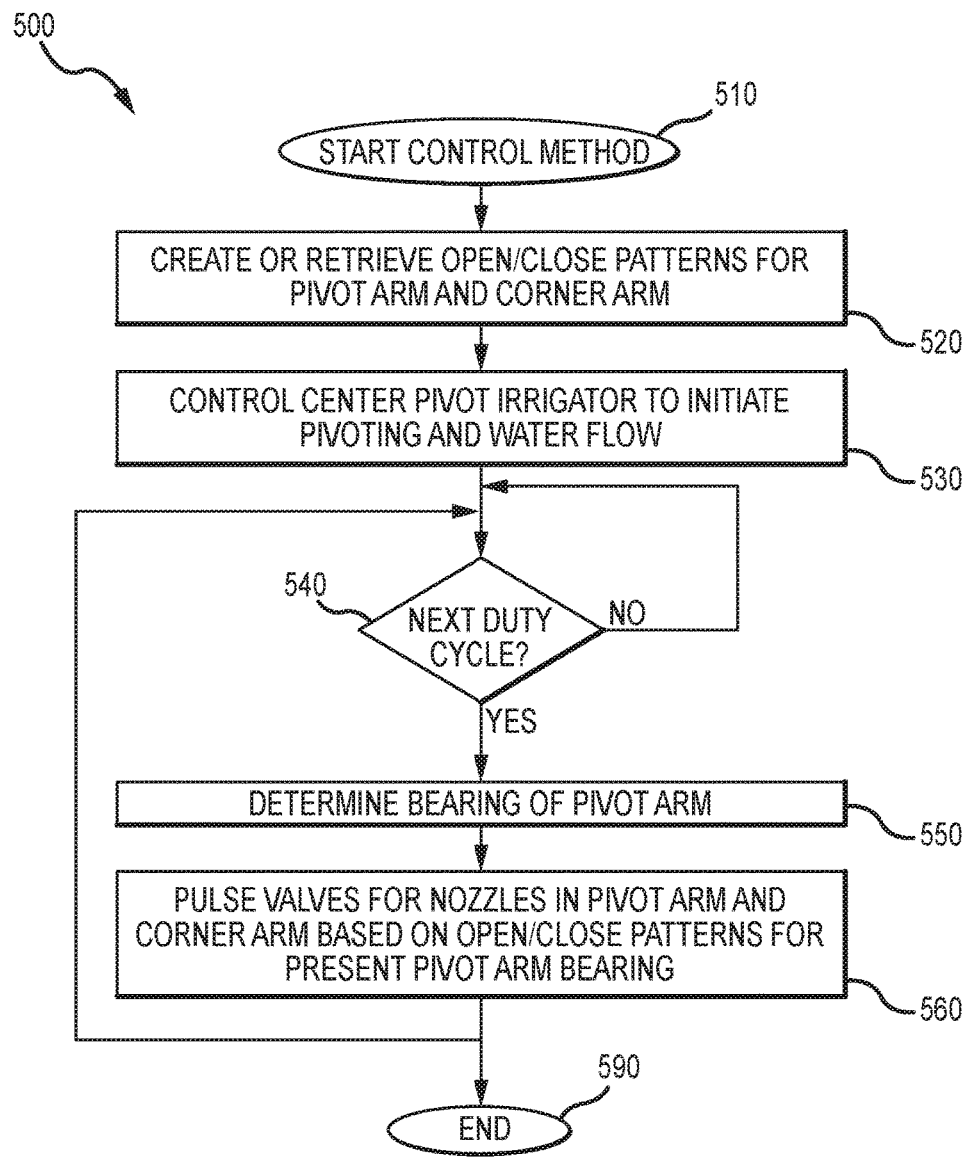
FIG. 5 is a flow diagram of an exemplary flow control method that may be implemented, e.g., by a controller of the systems of FIGS. 2 and 3, to provide more uniform depth or application of water input to an irrigation system.

FIG. 5 is a flow diagram (or algorithm) of an exemplary flow control method 500 that may be implemented, e.g., by a controller of the systems of FIGS. 2 and 3, to provide, in a first embodiment or operating/control state, more uniform depth application of water input to an irrigation system such as systems 100 and 300 of FIGS. 2 and 3 or to provide, in a second embodiment or operating/control state, variable depth application of water input to the irrigation system on two or more user defined zones under the corner pivot arm (or corner arm). As shown, the flow control method 500 starts at 510 such as with downloading a valve operation module onto a valve controller of an irrigation system and, as needed, equipping the irrigation system with valves for controlling each nozzle/sprinkler along the length of the pivot arm and the corner arm. Further, the irrigation system may be modified to include one or more location monitors for determining a present location and/or bearing for at least the pivot arm and, in some cases, for the corner arm.

The method 500 continues at 520 with generating or retrieving from memory an open/close pattern (or valve pulsing schedule) for the pivot arm and its valves/nozzles and also for the corner arm and its valves/nozzles. The generation of this pattern/schedule for the corner arm for uniform flow (first embodiment) or for variable depth application (second embodiment) is discussed in greater detail below, but, for now, it should be understood that the open/close pattern defines a pattern along the corner arm of open valves (operating nozzles) and closed valves (non-operating nozzles) for each particular bearing of the pivot arm for the entire rotation cycle of the pivot arm. The pattern may be repeated for some duty cycles (e.g., until move out of a corner or out of an edge area of a field) or modified between each duty cycle (e.g., when the corner arm is accelerating or decelerating rapidly). At 530, the flow control method 500 involves the irrigation system controller operating to initiate rotation of the pivot arm about its center pivot base (at a predefined speed or rotation rate). Step 530 also includes operating a pump(s) to begin to provide an input flow of water for irrigation into the pivot arm (or its pipes) and also into the corner arm (or its pipes) via a fluidic coupling with the end of the pivot arm.

The method 500 continues then at 540 with a determination if a next duty cycle has begun (will begin) (e.g., a time period that may be selected to be between 20 and 90 seconds such as 30 seconds in some prototypes of the presently described irrigation systems). If not, the method 500 continues with operating the irrigation system in a steady state (with the same open/close pattern to set which valves are opened and which are closed). If yes at 540, the method 500 continues at 550 with data from a location monitor (e.g., a GNSS receiver) being processed by the controller to determine the present location and/or bearing of the pivot arm (e.g., is the pivot arm near an edge of the field, partially into a corner, wholly into a corner, or the like).

With the bearing information for the pivot arm, the controller then acts at 560 to operate the valves of the irrigation system to provide desired flow through the nozzles to achieve uniform water application across portions of the field under the irrigation system (first embodiment) or to achieve variable application depths under the corner arm (second embodiment). To this end, the open/close pattern for this bearing for the pivot arm is used to pulse open or closed the valves of the pivot arm. Further, the open/close pattern for the corner arm for this particular bearing of the pivot arm is used to pulse open or closed the valves of the corner arm. Then, the method 500 may continue at 540 with determining whether the valve duty cycle has expired or whether the present valve pattern should be retained in the pivot and corner arms. Once the duty cycle is ended (e.g., a 30 second period has ended), the method continues at 550 with determining a new bearing of the pivot arm and, if needed for the new bearing, pulsing the pivot and corner arm valves open or closed according to a new open/close pattern associated with the new bearing. Otherwise, the irrigation system may be shut down and the control method 500 will end at 590.

When using the general control method 500, it should be understood that proper control over the irrigation system relies upon successful calculation of a schedule of valve pulsing to obtain uniform irrigation under the corner pivot arm (first embodiment) or to obtain variable depth application in two or more user-defined areas or zones under the corner pivot arm (second embodiment). The application of the valve pulsing schedule can be provided to an irrigation system with a location monitor (e.g., an Irrigate-IQ product available from Trimble or the like with a GNSS module or the like) along with a main controller and valves that can be individually operated with a valve controller (e.g., a controller that is uniquely identified and controlled by the main controller). In one simulation or prototype, the inventor used a corner arm with thirty-four valves (and a like number of drop down sprinklers) each with a valve controller for each valve that was uniquely identified and controlled (e.g., the valve control nodes can be connected to the main controller via cable (wired communications) while the main controller is commanded via wireless communications).

To generate the corner arm's schedule of valve pulsing (that defines a specific open/close pattern for each pivot arm bearing), the path that the wheels of the corner arm followed/traveled during rotation of the pivot arm in a field was mapped to the field along with the center point and radius of the pivot arm. The position of each nozzle on the pivot arm and on the corner arm was recorded/mapped, too. Additionally, the positions of the nozzles on the pivot and corner arms were recorded/mapped, along with each nozzle's flow rate and radius of application (or radius of water flow from the nozzle at the flow rate).

The calculated or generated schedule of valve pulsing describes the open/close pattern of each valve on the corner arm (and pivot arm) for each bearing (or location) of the pivot arm as it rotates about its center pivot base in a particular field being irrigated by a center pivot irrigation system with a corner arm. The inventor divided the circle followed/covered by the pivot arm into a predefined number of bearing positions, such as 21600 bearing positions (i.e., 360 degrees multiplied by 60 minutes). A GNSS module was used at the last regular drive of the pivot arm (e.g., a location monitor provided immediately before (or inward) from the start of the corner arm or proximate to the pivotal coupling of the corner arm to the outer end of the pivot arm) to provide a controller with the location and the bearing of the main pivot pipe. Then, every thirty seconds (or other valve duty cycle), the main valve controller begins a process that instructs a controller at each valve to open or close the valve depending on the schedule of valve pulsing chosen for the bearing of the pivot arm. As an operational note (or practice tip), there is typically a controlled delay between each valve change to avoid sudden pressure changes in the pipe.

FIG. 6 illustrates a logic flow diagram or algorithm 600 for generating a valve pulsing pattern for use with at least the valves used to control flow to nozzles/sprinklers of a corner arm of a center pivot irrigation system to provide uniform water depth or application during irrigation processes. The method 600 starts at 605 such as with selecting a particular field to be irrigated and a center pivot irrigation system with a pivot arm and a corner arm for use in irrigating the field (e.g., an irrigation system with known arm lengths, with a known number and type of nozzles/sprinklers, and with known positions of the nozzles along the pivot and corner arms).

The method 600 continues at 610 with providing or generating a grid of water depth recording/value areas for the field. Step 610 may involve creating a grid of depth value squares or other shaped cells to cover a square having a size large enough to encompass the entire irrigated area of the irrigation system in the field. The size of each square water depth value area or cell in the grid is flexible to practice the method 600, but the size typically is chosen to be small enough to calculate variances in depth of irrigation across a single nozzle profile. For example, the size of the individual square areas or grid cells may be a third to a half a meter or the like. In the third of a meter example, a pivot arm with a 400-meter radius can be associated with a square area—and associated grid—that is 1000 meters by 1000 meters, and the grid would encompass 9 million grid squares (or grid positions) or cells for use in collecting/recording water depth from the nozzles of the irrigation system.

In step 615, the method 600 continues with retrieving or determining the ratings for each nozzle along with their positions on the pivot and corner arms. Then, the nozzles and their ratings are mapped to their positions on the appropriate arm of the irrigation system. Each nozzle in an irrigation system is individually rated based on its flow rate (e.g., number of liters it delivers per minute). Each nozzle is also rated or defined by the radius of throw or its radius of application when its valve is open (when it is used for irrigating). Additionally, the mapping in step 615 may include recording/mapping the distance from the last regular drive (or the end of the pivot arm) to the position of each nozzle on the corner arm.

The method 600 continues at 620 with determining the travel path over the field for each nozzle of the corner arm (and, in some cases, for the nozzles of the pivot arm or at least those affected by overlap with the corner arm nozzles). The corner arm of a center pivot irrigation system follows a predefined path (e.g., by predefined operations of the pivot arm and drive(s) of the corner arm) over the field during irrigation operations. The path is recorded (e.g., stored in computer memory/data storage) and is used in step 620 to calculate an individual path of travel over the field for each nozzle on the corner arm (e.g., by a processor running software/programs to generate a valve open/close pattern).

At step 630, the simulation of travel of the pivot and corner arms over the field during an irrigation process is began or initiated (with simulation, again, being performed by the processor running the software/program configured for generating the valve open/close patterns for each bearing or corner arm location). In step 640, the irrigation depth in each water depth area (or square) or cell of the grid is calculated or updated. The method 600 continues at 660 with determining whether there exist additional pivot arm positions for the pivot arm to make a complete circle about the center pivot point for the field. If yes at 660, the method 600 continues at 665 with moving the pivot arm and the corner arm to the next position (and the nozzles of the corner arm to the next point on their travel path from step 620) and then at 640 with adding to the water applied to grid areas/squares or grid cells under the moved nozzles (under their coverage/application radii from step 615).

If no at 660, the method 600 continues at 670 with determination of an optimal nozzle control pattern or valve open/close pattern, at least for the corner arm and its valves used to open/close its nozzles/sprinklers to provide uniform application in areas affected by the corner arm of the irrigation system (in the first embodiment with the second embodiment/variable depth application described below). Then, at 690, the method 600 is ended, and the open/close pattern or valve pulsing schedule from 670 (which defines a pattern of open/closed nozzles on the corner arm for each bearing of the pivot arm) is passed to a valve/flow controller of an irrigation system for use in irrigating the field used in the simulation of method 600.

In practicing the method 600, an irrigator or center pivot irrigation system can be simulated in time-based movements. For example, this can be the movement of the pivot arm and corner arm pivotally coupled to the pivot arm in each 30 second period (or other useful time period). In one implementation of method 600, the simulated position of each nozzle is moved to the position over the field it is expected to be in 30 seconds time (e.g., in step 665). When calculating the expected depth of irrigation based on a known nozzle control pattern, the depth of the grid area/ square/cell for each nozzle that is fed by an open valve and for each grid point/cell that is within the coverage radius (or spray area) of the nozzle is incremented by the depth that the nozzle provides in this time period (e.g., in 30 seconds or the other time period used for time-based movements in step 665). For example, a nozzle with a throw radius of 5.8 meters will cover about 106 square meters. In an example grid with a third of a meter spacing, the nozzle will affect about 951 grid points/cells at each time point for which the nozzle has its control valve opened. The depth at each of these grid areas, points, squares, or cells at an exemplary flow rate of 25 liters per minute would be incremented (at step 640) by about 0.013 millimeters.

Calculating an optimal nozzle control pattern follows a similar process including iteratively increasing the amount of time that each nozzle will irrigate at each position until the desired depth of irrigation is reached. The typical nozzle on a pivot or corner arm of an irrigator is designed to work at a certain flow rate, and this means that to control the flow of an individual nozzle it is useful to pulse the nozzle on and off (by opening and closing its control valve). The proportion of time that the nozzle is allowed to distribute water can be controlled, in other words, by pulsing valves paired with each nozzle/sprinkler.

In order to maintain a consistency of pressure and flow in the overall irrigator, it may be desirable to orchestrate the timing of the valve changes in relation each other. As a result of this desire, the valves may be pulsed in a regular time pattern. For example, each valve state change may be controlled so as to occur once every 30 seconds or other valve duty cycle. In such an example, for any 30-second time period, a valve is either open or closed for the entire 30 second period (or other useful valve duty cycle or pulsing time period).

The inventor also recognized, though, that valves are being moved over the field during operations of the irrigation system even while they are being pulsed on and off. As a result, in order to achieve variation in the depth of irrigation over a certain piece of land, there is often a limit to how many valve state periods can be considered to be in the same place. For example, the inventor determined that an individual piece of land can more realistically be impacted by 6 thirty-second time periods over a total three-minute period.

Using this example of 6 thirty-second valve state periods to determine the optimal nozzle control pattern, one can simulate the irrigation system as described above six times, with each time at increasing flow rate for each valve. On the first iteration of the simulation each nozzle is considered to be running at one sixth of its rated flow. During the simulation process, the calculation determines whether each nozzle should be on at each time position. If a nozzle is determined to be off at a certain time position at the flow rate for this iteration, it will be excluded from consideration for iterations at a greater flow rate. On the second iteration of the simulation, each nozzle that was determined to be on at the one sixth flow rate is considered to be running at two sixths of its rated flow. During the simulation process, the calculation involves determining whether each nozzle that was on at the one sixth flow rate could be on at the two sixths flow rate at each time position.

This process is then repeated for each of the six flow rates for each nozzle, which results in a determined flow rate between zero and always on for each nozzle for each time position of the irrigation system (e.g., each position of the corner arm). To help ensure that the effect of the valve pulse rate is not overridden by a fluctuating change in the flow rate, a change to the flow rate of any valve may only be considered if that flow rate would remain constant for a certain number of cycles. For example, ensuring that the flow rate would remain the same for 30 cycles would ensure that five repetitions of a six-cycle flow rate occur.

The following is an exemplary algorithm or process that the inventor followed to generate a useful valve pulsing pattern for each valve/nozzle pair on a corner arm of a center pivot irrigation system, and this example can readily be used with other particular implementations to generate valve pulsing patterns for use in controlling an irrigation system to provide uniform application with a corner arm. As discussed above, the algorithm or process is typically implemented using a computer or computing device implementing or running software/programs to generate valve pulsing patterns or valve open/close patterns for each pivot arm bearing (or corner arm location) in the field being irrigated.

Initially, the simulation is run for non-corner nozzles. First, the non-corner nozzles are applied to the grid of water depth positions or squares at their full flow rate. This involves a recognition that: (a) the throw distance and flow rate of the nozzles before the last regular drive will overlap the land that the corner arm covers; (b) the corner arm nozzles will also throw water over the circular area covered by the pivot arm; and (c) both of these overlaps should be considered when determining at what flow rate each nozzle of the corner arm should be set. Second, for each non-corner nozzle and for each time period the following steps are performed: (a) determine the position of the center point of the nozzle at this time period; (b) determine which grid areas, positions, or cells will be affected by the nozzle; (c) determine the effective depth of application for this time period for each grid cell; and (d) add the effective depth of application to the depth at each affected grid area, position, or cell.

Then, the corner nozzles are considered or calculated in the pattern-generation algorithm. Note, the valves are processed in an order that helps to distribute the effective irrigation across the length of the corner arm. Specifically, the valve at the outermost extent is processed first and then each fourth valve in turn. Next, every fourth valve is considered starting at the third to the last or most outermost. In a next iteration, every fourth valve is considered starting at the second to the last or most outermost followed by processing of every fourth valve starting at the fourth to last valve. For example, a corner arm for which it is desired to provide a valve pulsing schedule may have 34 valves (and 34 nozzles or sprinkler heads), and the above-detailed processing would proceed as (with the numbers being used to represent the valves by number with the higher numbers associated with outer most valves): (1) 34, 30, 26, 22, 18, 14, 10, 6, 2; (2) 32, 28, 24, 20, 16, 12, 8, 4; (3) 33, 29, 25, 21, 17, 13, 9, 5, 1; and (4) 31, 27, 23, 19, 15, 11, 7, 3.

Next, for each proportion of flow rate (e.g., 1/6, 2/6, 3/6, 4/6, 5/6, and 6/6 or the like) and for each nozzle, the pattern generation algorithm includes: (a) determining the depth of irrigation for the nozzle at one increment of flow (e.g., always 1/6); (b) determining the depth of irrigation for the nozzle at this proportion of flow rate in each time period; (c) for each time period at the lowest flow rate and for each time period in subsequent flow rates that this nozzle was able to irrigate at the previous flow rate: (1) determining the position of the nozzle; (2) determining the deepest current depth of grid cells affected by this nozzle by checking each grid cell affected by this nozzle (note that the "deepest" may take the third deepest or the second standard deviation from the mean or such other calculation to exclude outlier values that could otherwise skew results); (3) calculating the variance between the desired depth of application and the deepest value found at the prior step, and an allowance above this variance (e.g., 5 percent) may be added to help provide a smooth result; and (4) if the variance is larger than the incremental depth of the nozzle and if the change to this rate will last for a minimum number of cycles (such as 30 cycles), recording in a schedule that this nozzle will be on at this proportion of flow at this time period; (d) once the entire cycle of the pivot has completed for determining this nozzle at this proportion of the flow rate, applying this flow rate to the grid; and (e) for each time period that the nozzle was recorded to be on at this flow rate (1) determining the position of this nozzle; (2) determining which grid positions or areas will be affected by the nozzle; and (3) adding the incremental depth of application for this nozzle to the depth at each affected grid position or area.

At this point in the description, it may be useful to turn toward the second embodiment of generating valve open/ close patterns for the nozzles/sprinklers of a corner arm of a center pivot irrigation. In this second embodiment, a user (e.g., farmer) first interfaces with the controller software to generate an irrigation plan or map defining two or more zones for application of differing (or variable) application depths in the areas of the field/land under the corner arm. A prescription grid is then determined for this irrigation plan (e.g., to define which groups or sets of grid cells are under which zones and assigning an application depth to these various cells/squares). The method then continues with simulating irrigation (e.g., as discussed above for the uniform flow/depth embodiment discussed above and/or as explained in greater detail below) while ensuring or controlling levels of irrigation to avoid over watering/irrigating (e.g., inventor developed the pattern generating software to prefer under watering to over watering). The simulated irrigation is used to try to achieve the prescribed depth in each of the cells of the prescription grid with a valve open/close or control pattern defined for each pivot arm bearing (or each location of the corner arm).

One interesting part of generating the valve open/close patterns for achieving variable depth application under the corner arm involved determining which grid cells are under a nozzle at a position of the corner arm. To this end, the land under the irrigator is split up into a grid of evenly sized cells (e.g., square cells or other shaped cells), with one implementation of the pattern-defining method using half meter square cells. As the simulation runs to determine where nozzles can apply more substance (e.g., water or fertigation and so on), the processor running the software/program simulates the movement of each nozzle over the land.

The simulation includes calculating substance placement over the land by dividing each nozzle's motion into several positions at an even time spacing. Time spacing is useful in the simulation because each nozzle sprays a specified volume of water (or substance) per minute such as 40 liters per minute or the like. On a corner arm, each nozzle of the irrigator will travel a different distance in each time slot (over each time period) depending whether the corner arm is opening up (accelerating) or closing back inward (decelerating) and how far out on the corner arm the nozzle is located. Nozzles closer to the last regular drive of the pivot arm travel at a more constant speed, e.g., closer to the speed of the last regular drive on the pivot arm. Nozzles at the outer end of the corner arm, in contrast, are greatly affected by the acceleration and deceleration of the corner arm drive wheels as the corner arm extends into the corners of a field and then retracts back behind the last regular drive. The calculation or algorithm simulates a constant time movement of the last regular drive and then maps the position of each nozzle on the corner arm as it would be at the end of the movement period. For example, the simulation/pattern defining algorithm may be configured to divide the full rotation of the pivot arm into 21,600 equal movements (i.e., 60 minutes multiplied by 360 degrees).

Figure 7:
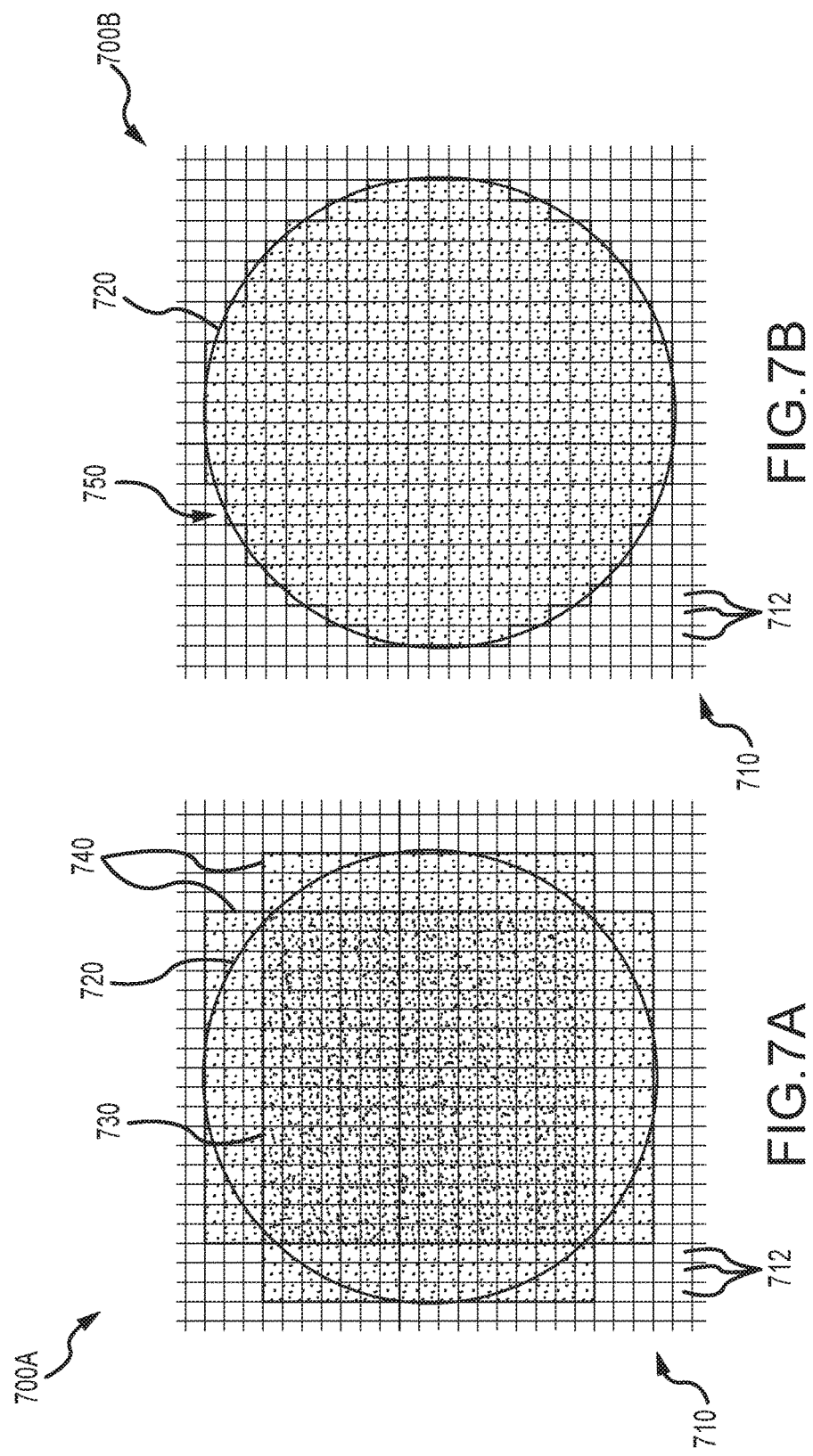
FIGS. 7A and 7B illustrate graphs showing a process of determining which cells of a grid are under a nozzle at a calculated/determined nozzle position.

At each nozzle position, the algorithm/method continues with determining which grid cells will be impacted by the nozzle if it is spraying at a given radius. The first step is to determine which cells are definitely within the nozzle's radius and which cells could potentially be within the nozzle's radius. FIGS. 7A and 7B illustrate graphs 700A and 700B showing the process of determining which cells of a grid are under a nozzle at a calculated/determined nozzle position. The grid 710 of squares or cells 712 is shown in the graphs 700A and 700B, and, as discussed above, a prescribed application depth is assigned (and stored in memory) to each of these squares/cells 712. The circle 720 is drawn to define/represent the circle of substance (e.g., water) throw or spray for the nozzle, with the nozzle being positioned at this moment in time of the simulation at the center of the circle 720 (e.g., to have a substance throw area with a radius of 5.8 meters or a different radius based on the particular nozzle and/or water flow to the corner arm).

An inner square 730 is generated or drawn within the nozzle's throw/spray radius (or wholly within throw circle 720), and every cell 712 within the square 730 (or outer boundaries of the square 730) is known to be or must be within the throw circle 720 of the nozzle (so has depth of application in the cell affected by nozzle). Hence, these grid cells/squares 712 are included in the set or group of grid cells 750 determined to be under the nozzle at this particular nozzle position/location. Next, the algorithm/method continues by generating four sets of grid cells/squares 740 that may be within the nozzle's throw circle or area 720, and these sets 740 are created in the shape of rectangles formed by extending out (providing extensions of) the edges/sides of the inner square 730. For example, the side/edge is extended outward as long as a center one (or ones) of squares/cells 712 in the sets 740 falls within the throw area/circle 720 (in this example, the extension sets 740 include three rows or columns of cells 712 in the grid 710).

Each of the cells in the extension sets 740 may be within the circle/area 720, but a calculation is made to accurately determine which ones to include in the set or group of grid cells 750 under this nozzle. To this end, the second step of the algorithm/method is to individually calculate for each of the cells/squares in the extension set whether they are within the circle/area 720 (e.g., are within the radius of the nozzle's throw). This may involve determining a center of each cell 712 and then determining whether this center of the cell is within the circle/area 720. If so, the entire cell 712 of the extension 740 is determined to be inside the nozzle's throw area/circle 720, and these cells/squares are included in the set of cells 750 under the nozzle at this nozzle position.

Figure 8:
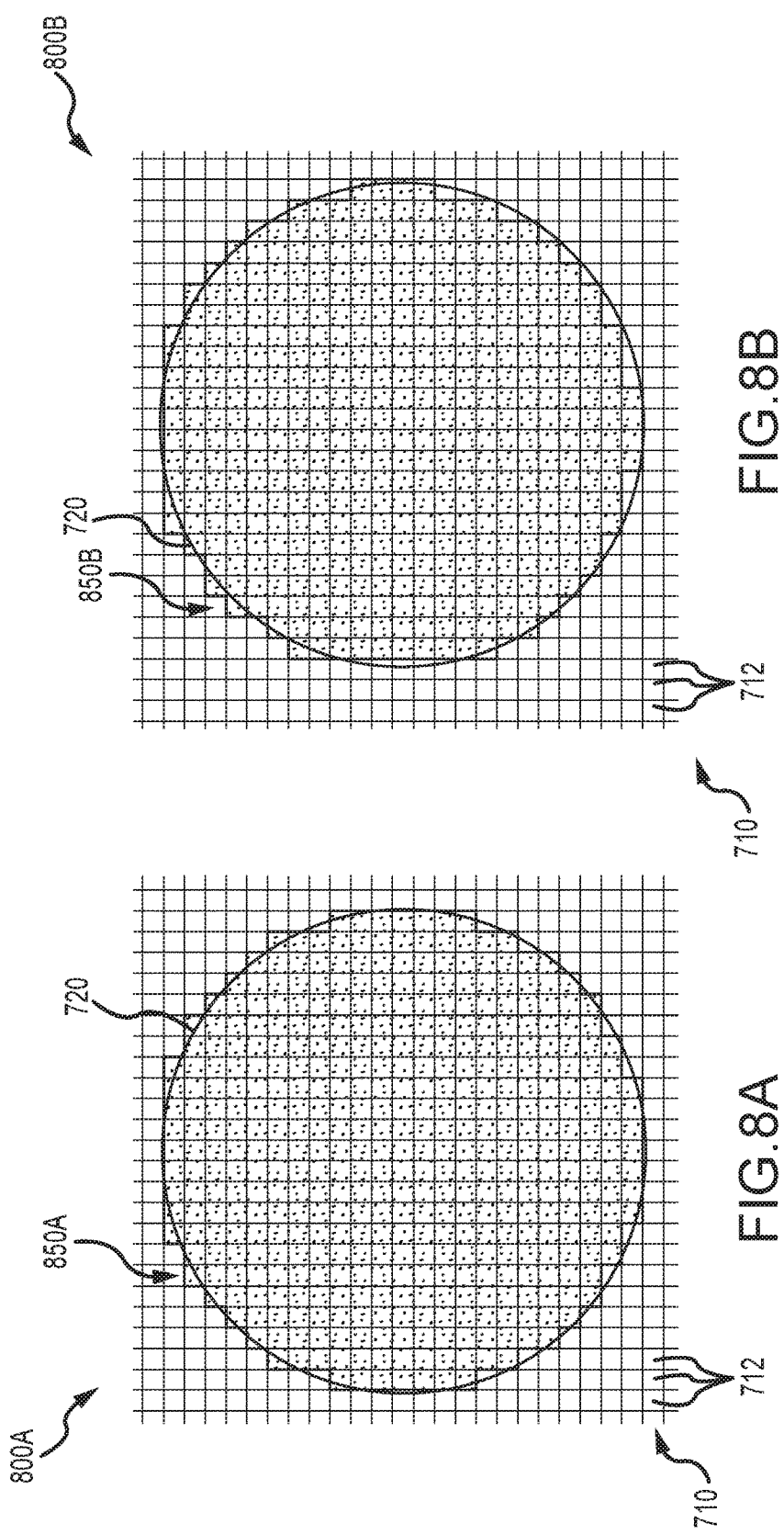
FIGS. 8A and 8B illustrate graphically two different grid patterns/sets that may be generated defining which cells of a grid are affected by spray/watering of a nozzle at a position/location.

As a next step in the process of generating the valve open/close pattern for achieving variable application depth under a corner arm, the applied depth is accumulated to each of the grid squares in the grid. With the exemplary nozzle having a 5.8-meter throw radius, there will be approximately 422 cells considered to be irrigated or affected by the nozzle. This number can vary depending on how the grid cells center under the nozzle's throw area or circle 720. For example, FIGS. 8A and 8B illustrate, respectively, two different grid patterns/sets 850A and 850B that may be generated as the cells 712 of a grid 710 affected by spray/watering of a nozzle at a position/location, and the patterns/sets 850A and 850B differ considerably in overall shape for just a slight movement of the nozzle as different cells are included or excluded. The pattern/set 850A has 427 cells while the pattern/set 850B has 422 cells (for the same nozzle and nozzle location over a grid 710). Further, a perfectly centered example set/pattern (e.g., with an even grid shape) would, in this case, have 421 cells.

For consistency, the same depth of application is simulated per cell for the entire rotation of the irrigator regardless of how many grid cells have been selected. One liter of water covers one square meter to a depth of 1 millimeter. Therefore, the liters per minute rating of the nozzle is divided by the square meters of area covered by the nozzle. This value is then multiplied by the number of grid cells per square meter. In the example of the 5.8 meter nozzle radius and half meter grid cells, there is 105.683 square meters of coverage under the nozzle and four grid cells per square meter. An example nozzle spraying at 40 liters per minute will apply 0.378 liters per square meter or 0.0946 millimeters of depth per cell in a minute of time.

The nominal velocity of the pivot is then used to determine the time period of each movement stop. In the above example, for a pivot doing a full rotation in 24 hours on a simulated 21,600 movements, there will be 15 simulated movements per minute of time. In the example of 0.0946 of depth per grid cell per minute, at 15 movements per minute, this equates to 0.0063 millimeters of depth per grid cell in each movement where the nozzle is spraying. For each of the 21,600 movements of the pivot, the position of the nozzle is determined, the grid cells under the nozzle at that position are determined, and 0.0063 millimeters of depth is added to the simulated depth value (here in millimeters) of each those grid cells.

The valve open/close pattern generating algorithm/method continues with determining the nozzle rate based prescribed depth. The simulation makes a number of simulated rotations of the pivot, increasing the proportion of time that each nozzle is allowed to spray. For example, it may be useful to divide the flow rate of each nozzle by six and then make six simulated rotations of the pivot at 1/6 flow, 2/6 flow, 3/6 flow, and so on until finally 6/6 (or 100 percent) of the flow rate is simulated. At the first simulated rotation (e.g., 1/6 flow rate), all nozzles are simulated as being open. On each subsequent simulated rotation (e.g., 2/6, 3/6, 4/6, 5/6, and 6/6) only nozzles that were determined to be allowed to be open/to spray at the previous simulated rotation will be considered (as open/spraying). For example, a nozzle that is determined to not be able to spray/irrigate at 3/6 of its flow rate (e.g., to avoid over watering) cannot then spray at 4/6 of its flow rate.

At each simulated rotation, the system (e.g., the computer with a processor running the software/program for generating a valve open/close pattern for variable depth application under a corner arm) checks to see whether one proportion of the full flow rate of each nozzle can be applied to the simulated application depth grid. In the example above, a nozzle is applying 0.0063 millimeters to each grid cell at each position stop of the irrigator at full flow rate. In the example of dividing the flow rate into sixths, 0.00105 millimeters (or 0.0063 mm/6) of application depth is applied in each of the six simulated rotations (but, other denominators may be used other than six to practice the invention).

In the uniform depth corner system/embodiment, there is a prescribed depth of application set for the irrigator. The uniform depth corner calculation of the valve open/close pattern allows nozzles to increase their rate of application until the simulated water applied would exceed that single prescribed depth. For example, if the prescribed uniform depth of the irrigator is 5 millimeters, then every grid cell is tested during the open/close pattern generation to see whether its simulated application would exceed 5 millimeters if this nozzle is allowed to be increased to the next flow rate division (compare all grid cell depths to this single, uniform depth goal to avoid over irrigation/watering). As such, the 5 millimeter value is constant for every part of the field.

This is in contrast to generating the valve open/close pattern in the controlled variable rate under the corner arm system/embodiment. To apply a controlled variable rate under the corner arm (e.g., relatively uniform depths that differ to two or more zones defined by the user/farmer), an additional grid is created at the same dimensions and granularity as the simulation grid described above. The second grid is a "prescription" grid defining target depths, which allows farmers (or other users of the irrigation system of the present description) to define different application depth requirements across land under the irrigator (e.g., areas of a field that are irrigated by the corner arm).

Figure 9:
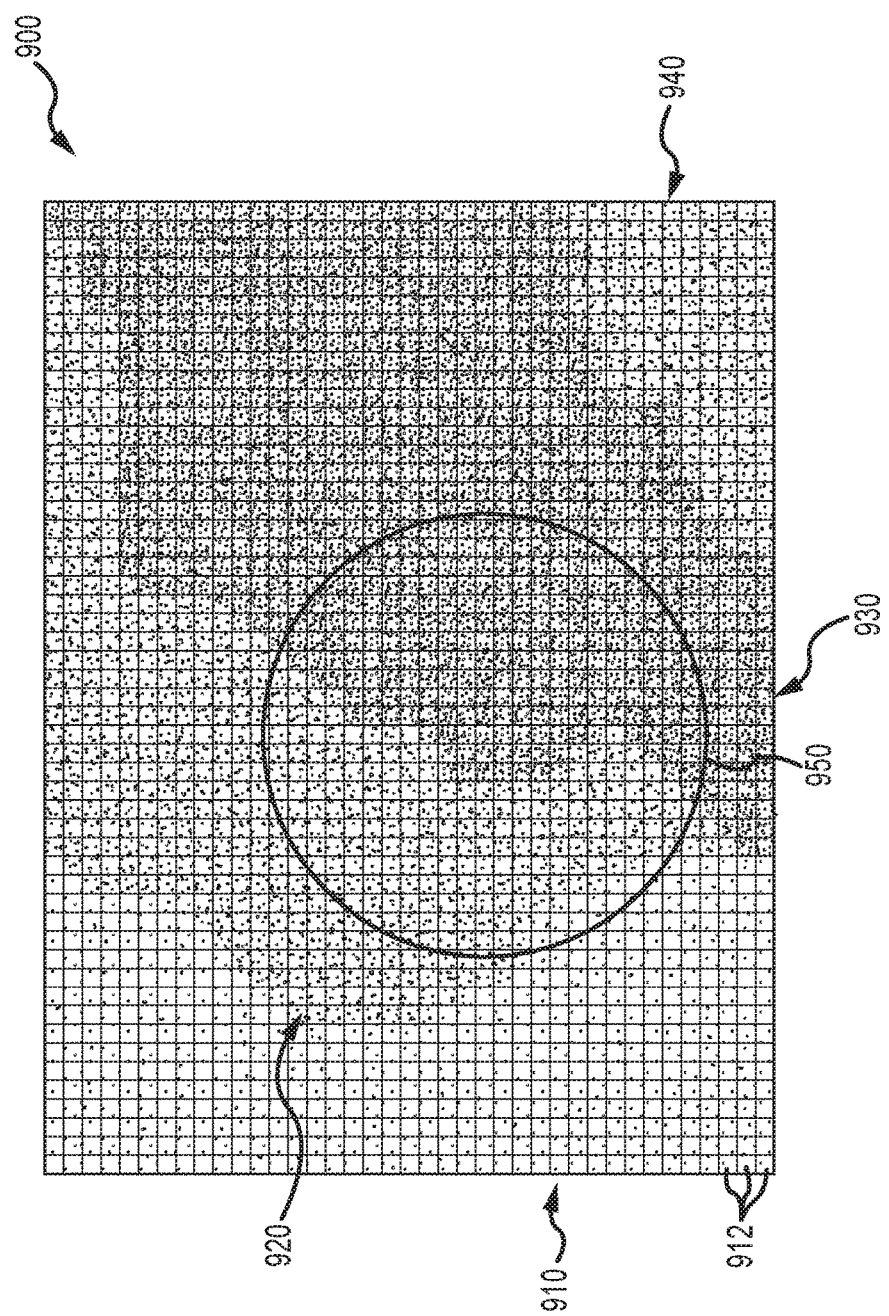
FIG. 9 illustrates an exemplary prescription grid with four irrigation areas or zone with cells associated with three different watering/application depths for use in generating valve open/close patterns for variable depth application under a corner arm.

Whereas in the uniform depth embodiment every grid cell depth value is compared to a constant prescribed depth (e.g., 5 millimeters in one example), the variable rate under the corner arm embodiment can involve instead comparing every simulated grid cell depth value to the depth value assigned or mapped to the "peer" cell in the prescription grid (e.g., the grid cell having the same size, shape, and location in the prescription grid as a cell in the simulation grid). For example, FIG. 9 illustrates an exemplary prescription grid 900 with four irrigation areas or zones 910, 920, 930, 940 with sets of cells 912 (e.g., half meter squares or the like) associated with three different watering/application depths for use in generating valve open/close patterns for variable depth application under a corner arm. While not readily visible in FIG. 9, the prescribed depths for the cells 912 in the first zone/area 910 is 3.3 mm, in the second and fourth zones/areas 920, 940 is 4.4 mm, and in the third zone/area 930 is 5 mm, and the nozzle spray or irrigation area is shown by circle 950 (e.g., the location of the nozzle being considered/simulated is in the center of circle 950).

The prescription grid 900 in the FIG. 9 example represents a section of an example prescription grid, and the section or grid 900 is about 25 meters wide by 20 meters high based on use of half meter square grid cells 912. The circular area 950 provides an exemplary nozzle application/irrigation area with a radius of 5.8 meters, with the nozzle located so the circular area 950 intersects with three different application depth zones 910, 920, and 930 (which in this example are associated with three different application depths). When simulating the output of the nozzle to determine whether the nozzle can be allowed to spray (have its control valve open in the valve open/close pattern to provide a higher flow rate), the system defining the open/close pattern functions to compare each of the cells 912 within the nozzle radius (e.g., within the nozzle's irrigation circle or area 950) in the simulated output grid to their peer cell 912 in the prescription grid 900. If a predefined number (default or user-defined parameter), such as three, of the grid cells in the simulated output grid would exceed their peer 912 in the prescription grid 900 then the nozzle associated with circle/irrigation area 950 is not allowed by the system to increase its rate. It has been determined by the inventor that it is better to under-irrigate than to over-irrigate. So, border situations occur where an area that would have allowed more irrigation does not receive more irrigation because doing so would result in over irrigating a neighboring area.

Figure 10:
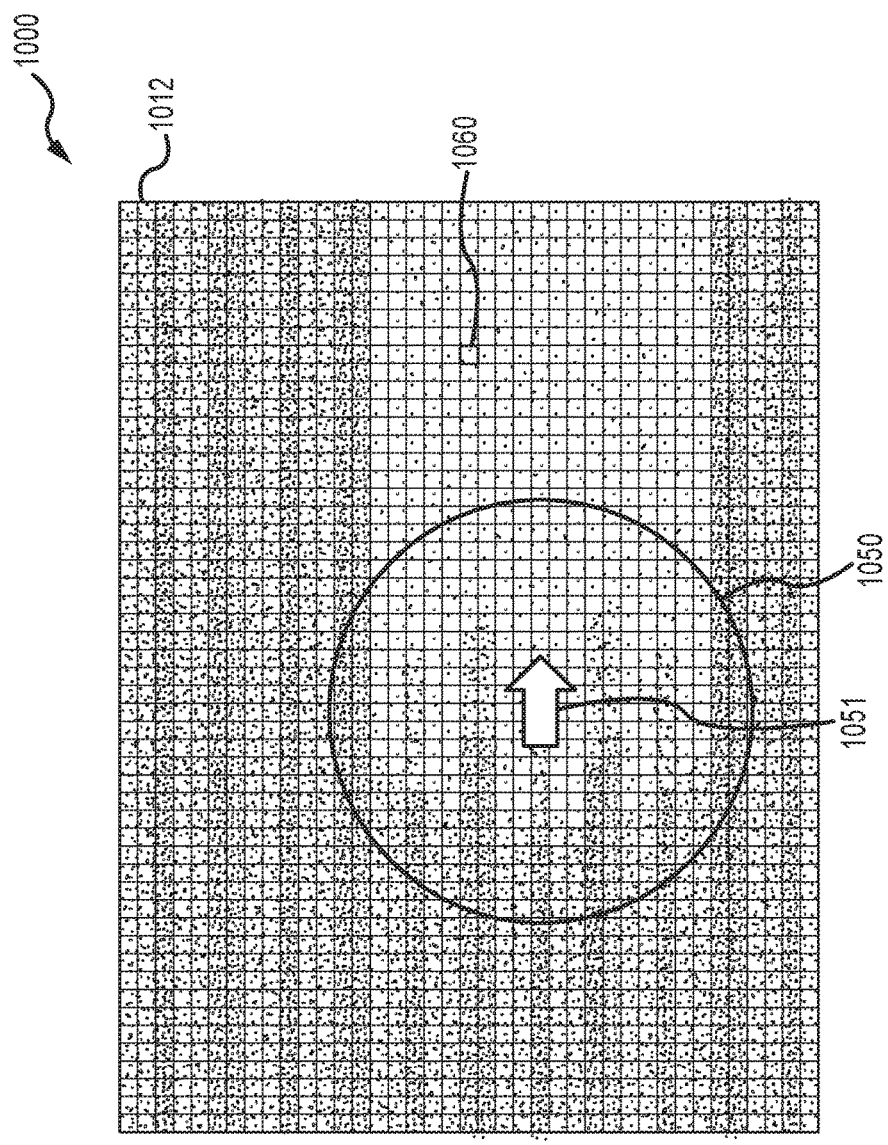
FIG. 10 illustrates a portion of a simulation grid (or area of land having irrigation simulated) as a nozzle is moved over the simulation grid in a later (non-initial) pass.

FIG. 10 illustrates a portion of a simulation grid (or area of land having irrigation simulated) 1000 as a nozzle is moved over the simulation grid in a later (non-initial) pass. Again, the simulation grid 1000 includes a plurality of grid cells/squares 1012 being used to record/track depth of received water/substance thus far in the simulation, and a circle or circular area 1050 represents a nozzle's throw/coverage area as the nozzle is moved across the grid 1000 as shown by arrow 1051 toward a particular grid cell 1060.

In the example of FIG. 10, a situation is demonstrated where neighboring nozzles that overlap the land/grid 1000 covered by this nozzle have already been simulated, and the nozzle associated with coverage area/circle 1050 is being simulated last. Specifically, in this example, the fourth pass out of six passes is being simulated. The nozzle's coverage is shown with the circle 1050 and is traveling (as shown with arrow 1051) across the grid/map 1000 from left to right. Across the simulated area/grid 1000, all nozzles have been on producing a range of depths (e.g., 3.1 to 3.3 mm in this example), and this variance or size of the range of application is completely dependent upon the overlap between neighboring or proximate nozzles on the corner arm. The simulation grid 1000 shows a slowly decreasing depth across the nozzle affected area 1050, with the driest areas being located where the nozzle associated with coverage area 1050 has spent the least amount of time so far in the simulated irrigation. To the left of the nozzle's location (center of circular area 1050) or where the nozzle has already been positioned in the simulation and watered/applied substance, the grid cells 1012 show deeper application depths (or these areas are the wettest areas of simulation grid 1000 and their stored/recorded application depths reflect this fact).

Figure 11:
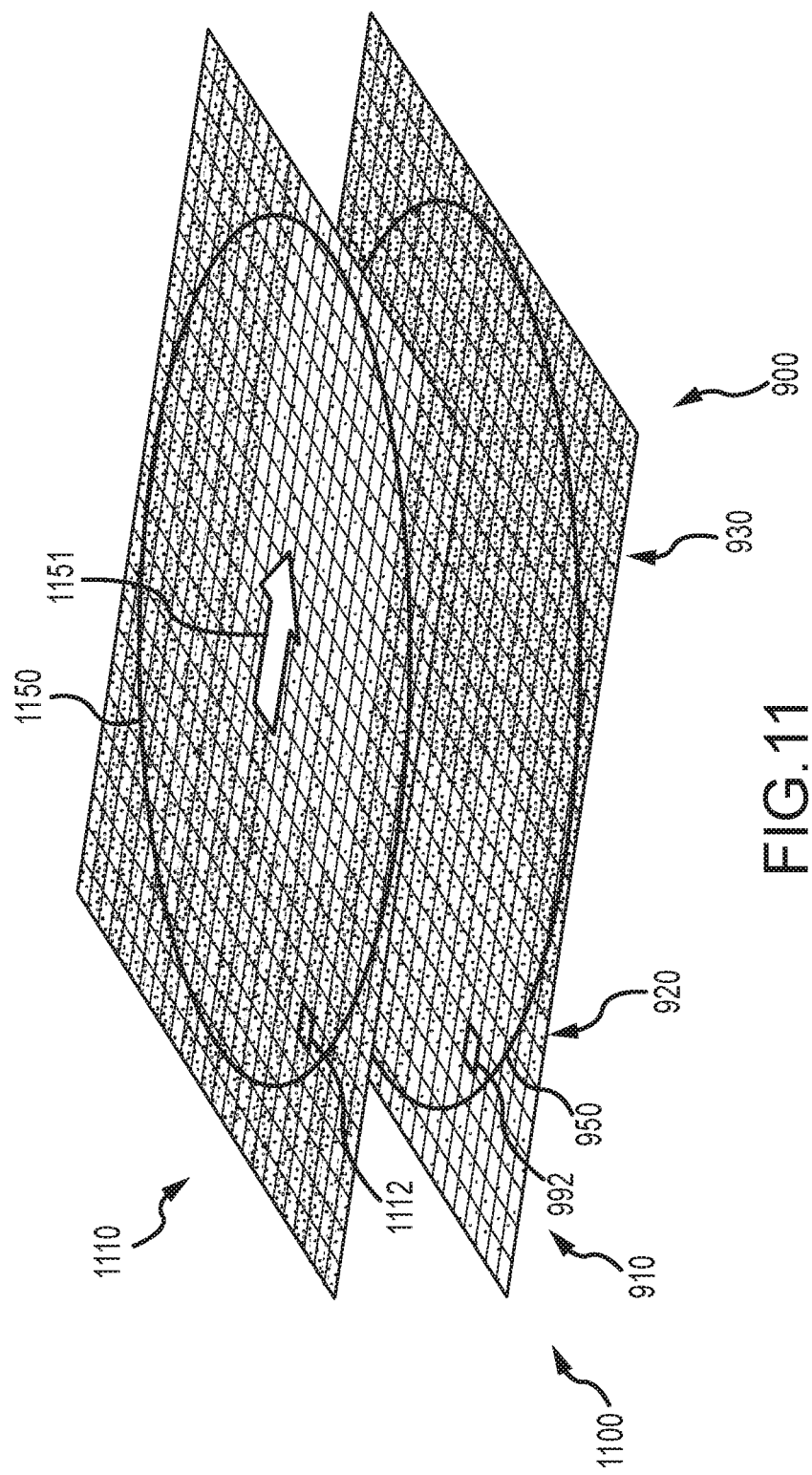
FIG. 11 illustrates graphically a comparison step/process carried out as part of generating a valve open/close pattern for a corner arm to provide variable depth application.

FIG. 11 illustrates a graph 1100 showing the comparison step performed by the computer system running the valve open/close pattern generating module/software. As shown, a simulation grid 1110 is used to record application of a nozzle with its coverage area/circle 1150 as a nozzle is moved across an area in the simulation grid (grid used to represent an area of land under a corner arm), and each grid cell including grid cell 1112 is updated to record applied water or substance to indicate the depth if the nozzle is allowed to increase its rate or to be open on this simulated pass. At each position of the nozzle (nozzle associated with coverage/application area 1150), the system compares the simulated applied depth of each grid cell (such as cell 1112) in the coverage area 1150 in the simulation grid 1110 to the prescription depth value of its peer cell (such as cell 992 in corresponding coverage area 950) in the application depth prescription grid 900. The comparison is used to determine whether over irrigation would occur in the coverage area (as may be defined by a predefined number of cells (such as three or a differing number of cells such as cell 1112) exceeding the depth value recorded for or associated with the peer cell in the prescription grid (e.g., an application depth for cell 992 in this example)).

Figure 12:
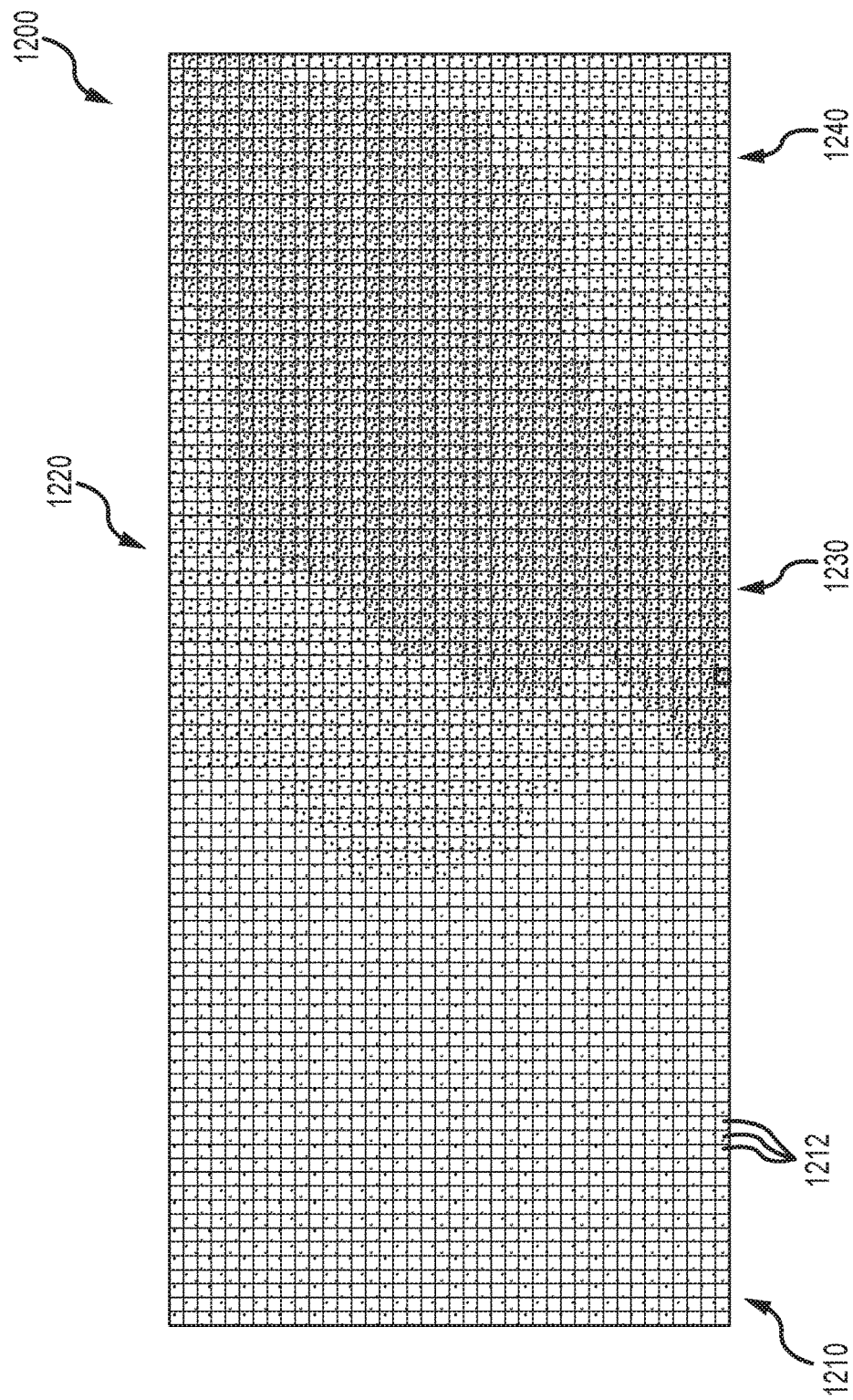
FIG. 12 illustrates a section or subset of a prescription grid for variable depth application control over a corner arm.

At this point in the description, it may be useful to the reader's understanding of variable application depth embodiment to provide a worked or simulated example of the process of applying nozzle spray levels from a prescription grid (generated in response to a farmer defining (such as with polygons) goal application depths in areas/zones of land in a field under or irrigated by the corner arm (with some overlap from nozzles/sprinklers of the pivot arm)). FIG. 12 illustrates a section or subset of a prescription grid 1200 for variable depth application control over a corner arm. The prescription grid 1200 includes four zones or areas 1210, 1220, 1230, 1240 each with a plurality of grid cells 1212 (squares in this case, which may be varied in size such as 0.5 meters on a side) and with irregular (or regular boundaries) associated with edges or boundaries of zones that may be user defined (e.g., to define areas of a field with differing crops, soils, or the like).

In this example, the first zone 1210 has a goal depth of 3.3 mm, the second and fourth zones 1220, 1240 have a goal depth of 4.4 mm, and the third zone 1230 has a goal application depth of 5 mm, and these goal application depth values are recorded or associated with each grid 1212 for each zone 1220-1240. In this example, the grid 1200 corresponds with a 20-meter wide strip of land with the irrigator traveling for 45 meters across this strip. Eight nozzles of the irrigator will impact (or apply substance such as water) this strip of land. There are three different depths of application represented in this area as shown to be in the four zones 1210-1240 of the prescription grid 1200. The irrigator (with the nozzles and water flow of this working example) would place or spray 5 mm of water with all nozzles on as it passes over the land associated with the prescription grid 1200.

Figure 13:
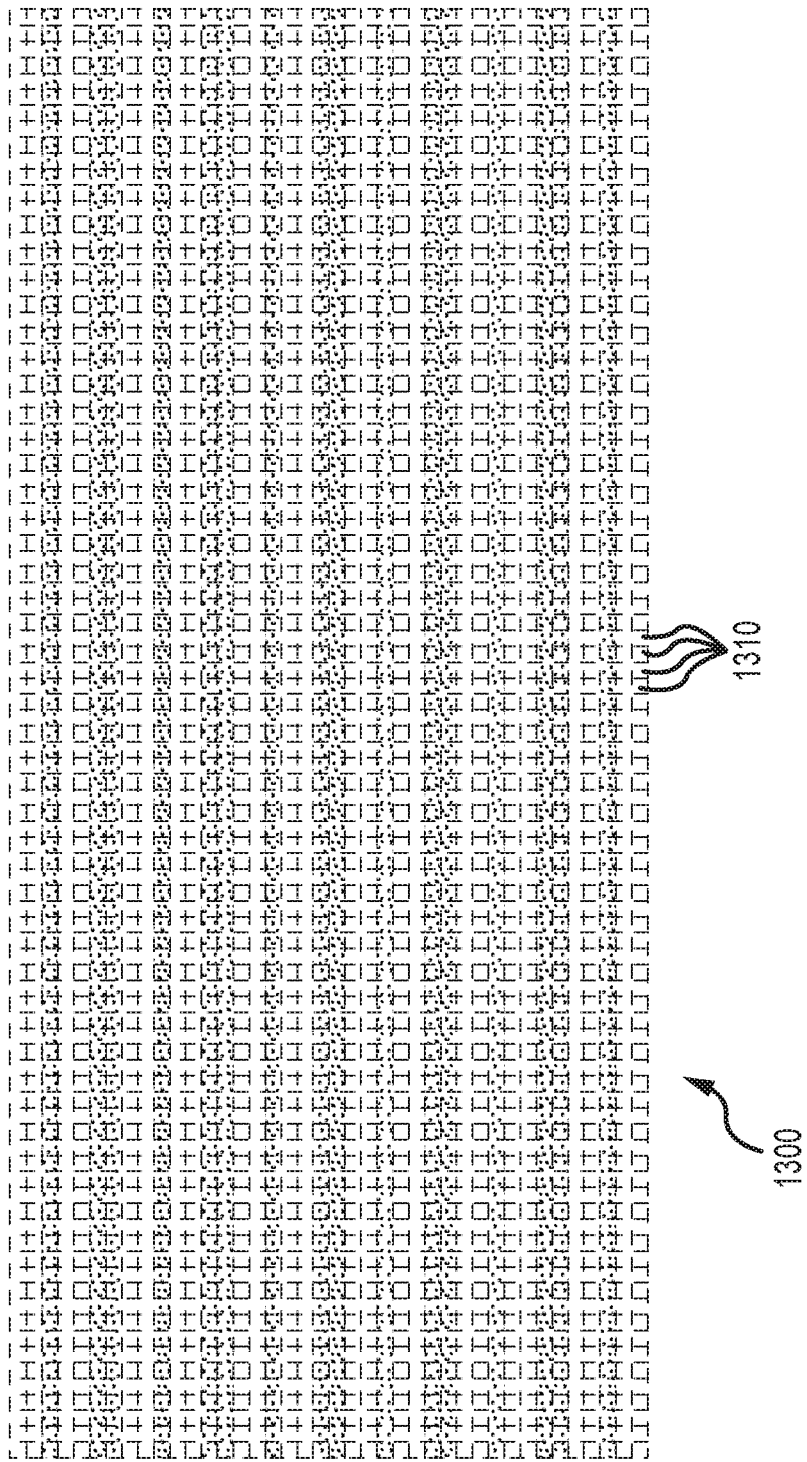
FIG. 13 illustrates a simulation grid at a particular stage in the irrigation simulation process to generate the valve open/close pattern for the corner arm for the prescription grid of FIG. 12.

FIG. 13 illustrates a simulation grid 1300 at a particular stage in the irrigation simulation process to generate the valve open/close pattern for the corner arm for the prescription grid of FIG. 12. As discussed above, the simulation grid 1300 has similar shape as the prescription grid 1200 with grid cells 1310 of the same number, size, shape, and location as the grid cells 1212 in the zones 1210-1240 of prescription grid 1200, and the depth of application is stored for each cell 1310 during the simulation. As a starting point for this working example, the simulation or valve pattern algorithm has already simulated four passes by the corner arm over the land associated with grids 1200 and 1300 and has determined that all eight nozzles can be on for at least 4/6 of the time at which the corner arm is over this strip of land. The simulation grid 1300 at this stage indicates that the grid cells store depth values in the range of 3.1 to 3.3 mm after four passes at 1/6 flow. The variance is due to how the nozzles' spray patterns (circular areas) overlap. This matches the lowest spray zone requirement (the first zone 1210 in prescription grid 1200 has depths of 3.3 mm assigned to its cells 1212), but no areas (no simulation cells) exceeds the prescribed depth.

Figure 14:
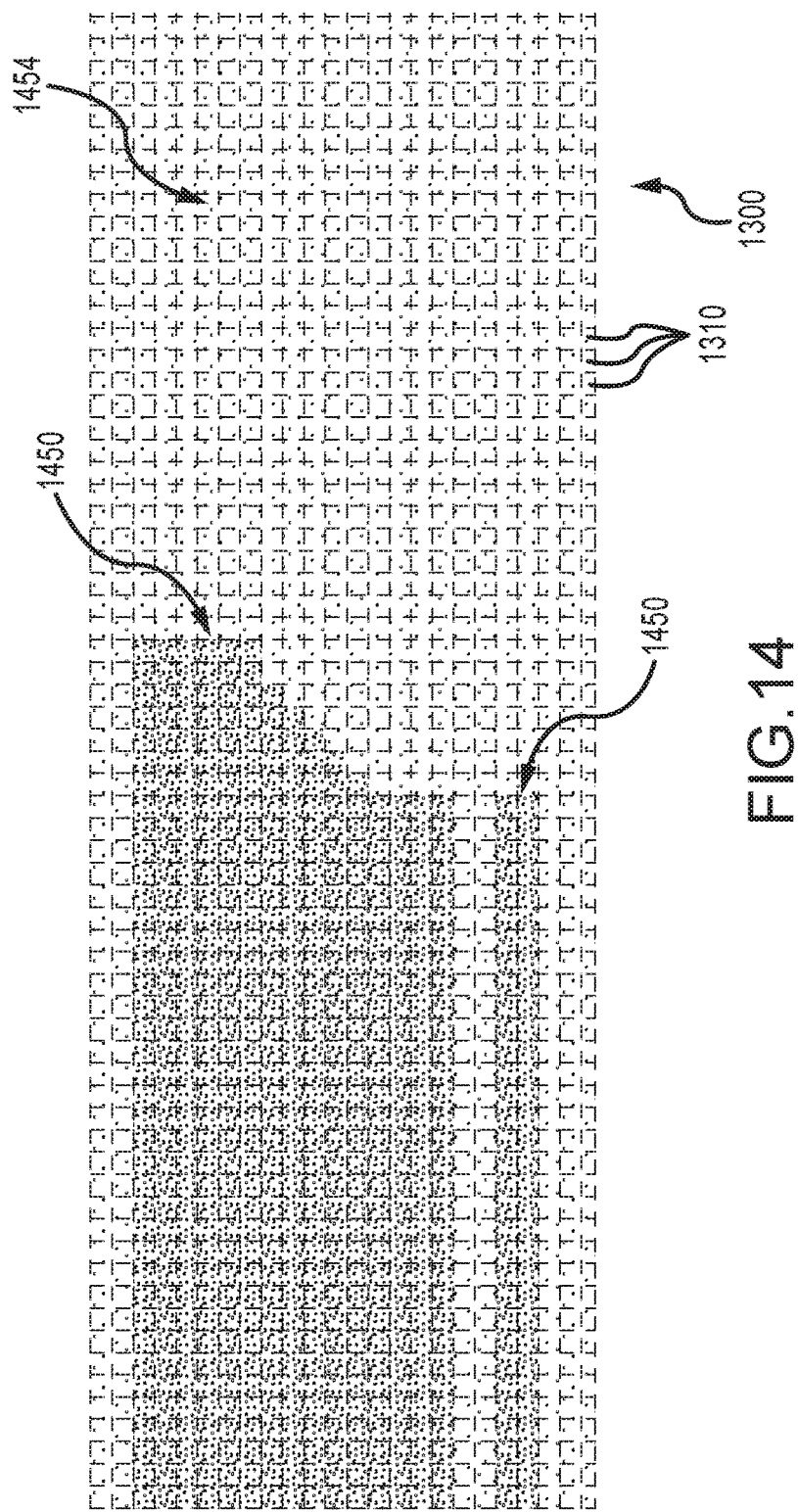
FIG. 14 illustrates the prescription grid of FIG. 13 during simulated irrigation with one of the set/number of nozzles affecting the strip of land that would result in areas of over irrigation if allowed (if allowed by the valve open/close pattern)
Figure 15:
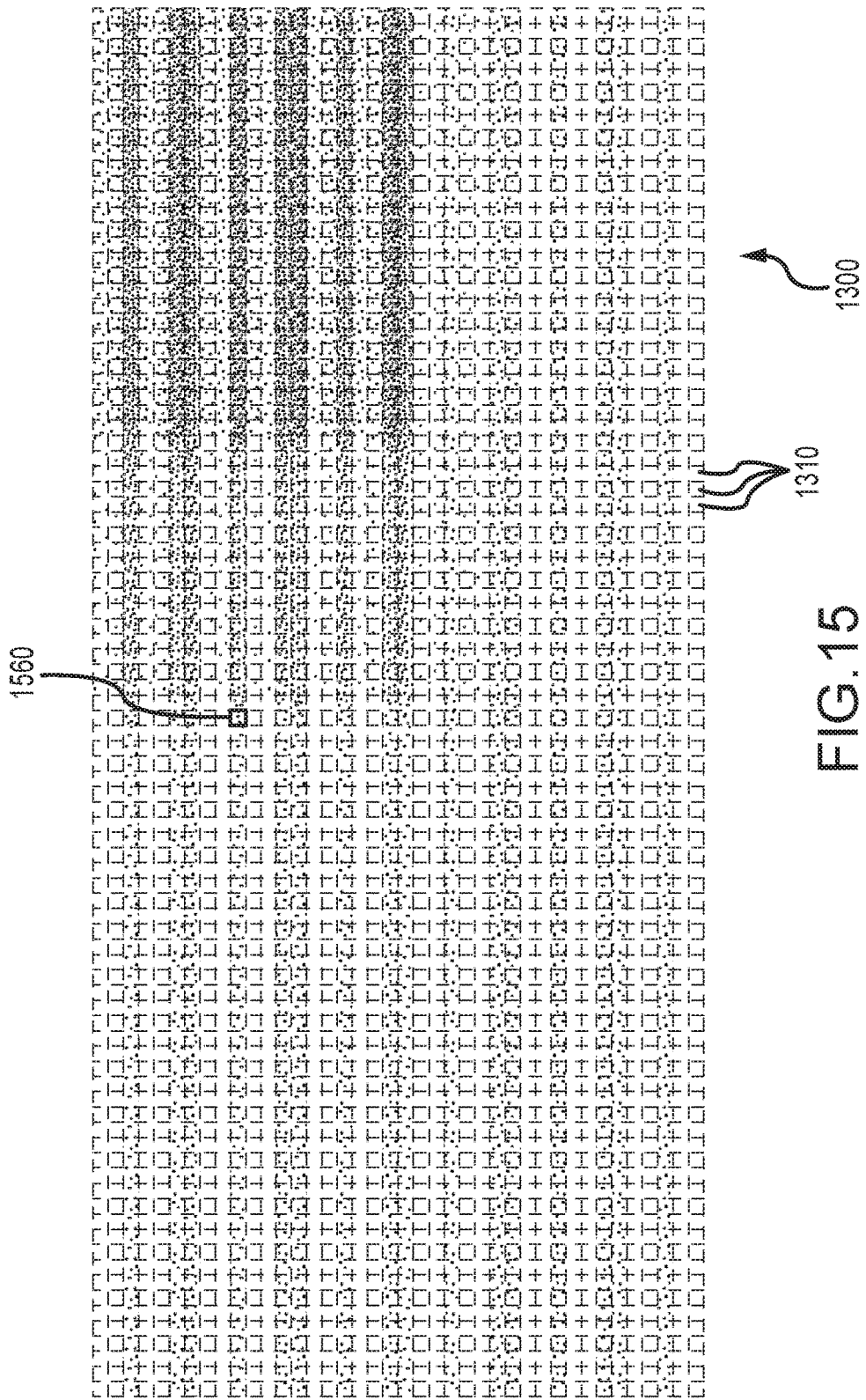
FIG. 15 illustrates a determination of a grid cell in the prescription grid coinciding with a location of the nozzle being simulated in FIG. 14 being over an area in which it can increase its flow.

The worked/simulation example can now continue by applying the fifth level of irrigation to several nozzles, and then we will add a nozzle at a time in a stepwise manner. FIG. 14 shows the prescription grid 1300 as simulation continues with areas (groups of grid cells 1310) being over irrigated 1450 and areas not yet being over irrigated 1454 (groups of grid cells 1310 at or below the prescribed values from prescription grid 1200). The simulated application of water/substance is first performed for the third nozzle that impacts this strip or area of land (from the top of the diagram). If this nozzle is allowed to apply 5/6 of the time for the entire strip of land, it will over irrigate the land that had been set to a prescribed depth of 3.3 mm as shown with the grid cells 1310 in areas/regions 1450. Instead, as shown in the simulation grid 1300 shown in FIG. 15, the valve open/close pattern generation process functions to apply the fifth level of rate with this nozzle (the third nozzle) only when it will not result in over irrigation. The simulation grid cell 1560 shows the center point of this nozzle when it is at a point where it is allowed by the pattern generation process to increase flow and, while not necessarily clear from the chart 1300 of FIG. 15, the simulated depths increase in a 5.8 meter radius circular area from this point/grid 1560 on as the nozzle travels from left to right over the prescription grid 1300 during the irrigation simulation.

Figure 16:
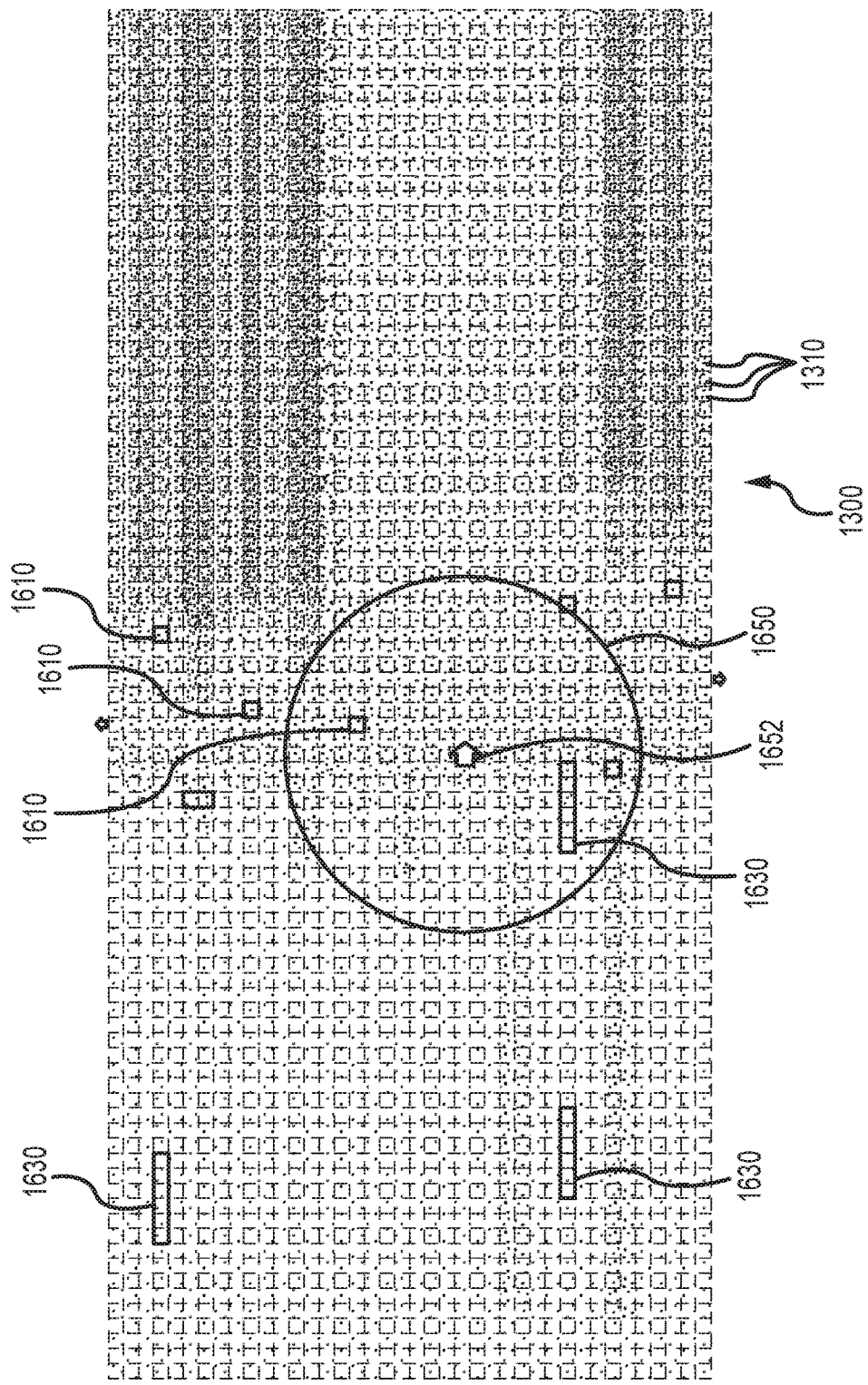
FIG. 16 illustrates the prescription grid of FIG. 13 after all but one of the nozzles affecting the strip of land have been applied up to a fifth level.

FIG. 16 illustrates the prescription grid 1300 of FIG. 13 after all but one of the nozzles affecting the strip of land have been applied up to a fifth level (where possible without over irrigation). The depth values for each grid cell 1310 are updated to reflect the effects of allowing these nozzles spray on the strip of land at the increased rates. FIG. 16 shows where each of the nozzles began irrigating by highlighting where the center point of their coverage areas was when the valve should open in the valve open/close pattern with square or square-shaped symbols 1610. The arrows 1620 and 1624 above and below, respectively, the prescription grid refer to the position of nozzles that affect this strip of land but whose center points (nozzle locations) are off the edge of the prescription grid. The rectangle or rectangular-shaped symbols 1630 are used in FIG. 16 to represent three short strips where a nozzle was applied to the fifth level to fill in slight areas of under irrigation in the valve open/close pattern.

In FIG. 16, the remaining nozzle in the set affecting the strip of land is being worked (in the irrigation simulation) across the strip as shown with coverage area 1650. It is simulated to have already moved to the point shown by arrow 1652. The nozzle, when watering, will impact (provide a depth of substance/water on) the area within the circle 1650. As it has simulated movement across the simulation grid 1300 to this position 1652, it has not yet been able to increase to the fifth level so as to avoid over irrigation.

Figure 17:
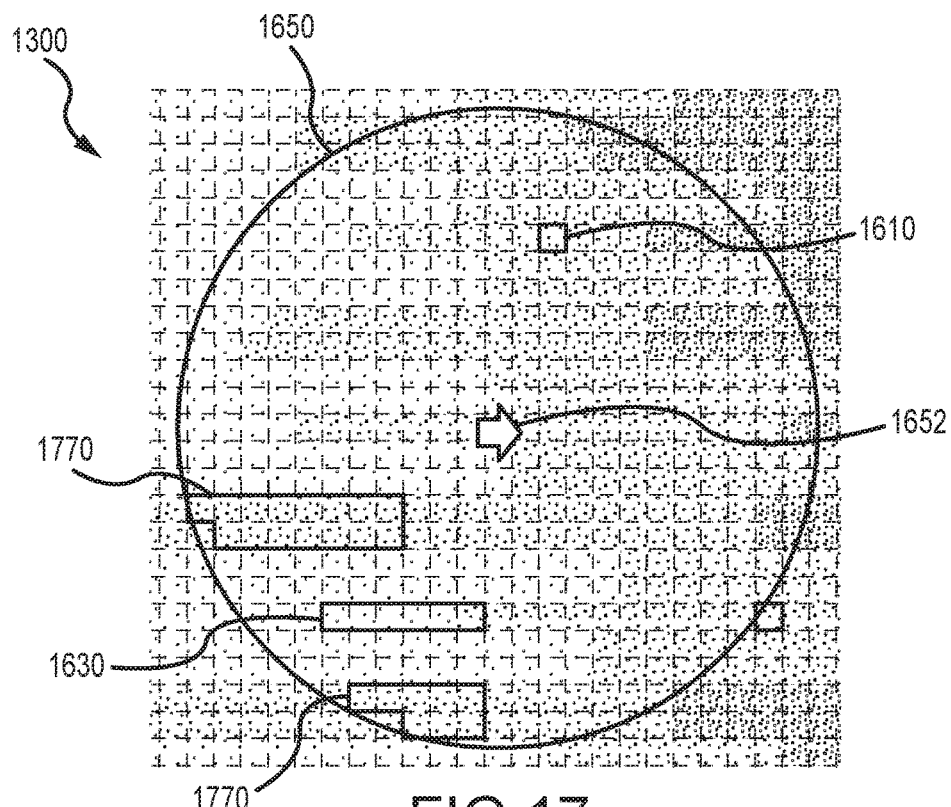
FIGS. 17 and 18 illustrate a portion of the prescription grid of FIG. 13 showing the simulation of allowing the final nozzle to increase to the fifth level at the location of FIG. 16 and then at a new nozzle location.
Figure 18:
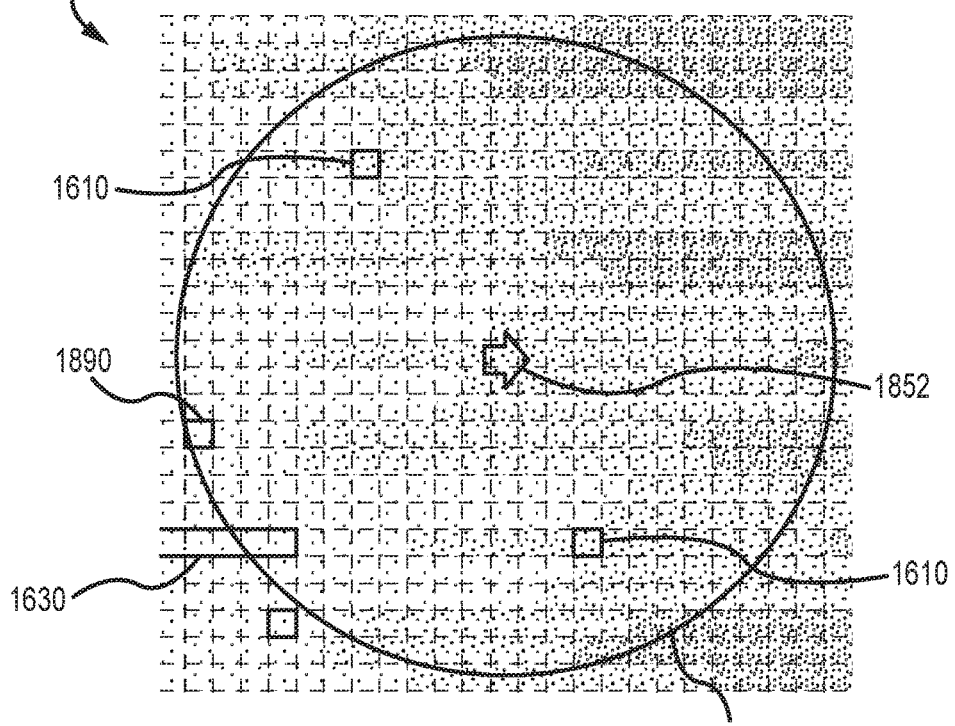

FIGS. 17 and 18 illustrate a portion of the prescription grid 1300 of FIG. 13 showing the simulation of allowing the final nozzle to increase to the fifth level at the location 1652 of FIG. 16 and then at a new nozzle location 1852. As shown in FIG. 17, if the nozzle application is increased to the fifth level at the nozzle location 1652, there are two areas 1770 that will be over irrigated as determined by increasing the depth value of these grid cells and comparing with prescription depth values for peer cells in the prescription grid. Therefore, the simulation algorithm of the valve open/close pattern generation module/software instead does not increase this nozzle to the fifth level, yet, and, instead, moves the nozzle to a next time position. This process is repeated until, as shown in FIG. 18, the nozzle is moved to a location 1852 that moves the coverage area 1610 on the simulation grid 1300. At the nozzle location 1852, the nozzle can be increased to the fifth level without over irrigation, e.g., one cell 1890 is determined by comparison of the updated depth of application value in simulation cell 1890 with a depth value for its peer cell in the prescription grid to be over irrigated. As discussed above, irrigation may be allowed with a nozzle if over irrigation only occurs in a number of cells below a predefined maximum number (such as 4 cells (e.g., over irrigation occurs when more than 3 cells would be over irrigated)).

Figure 19:
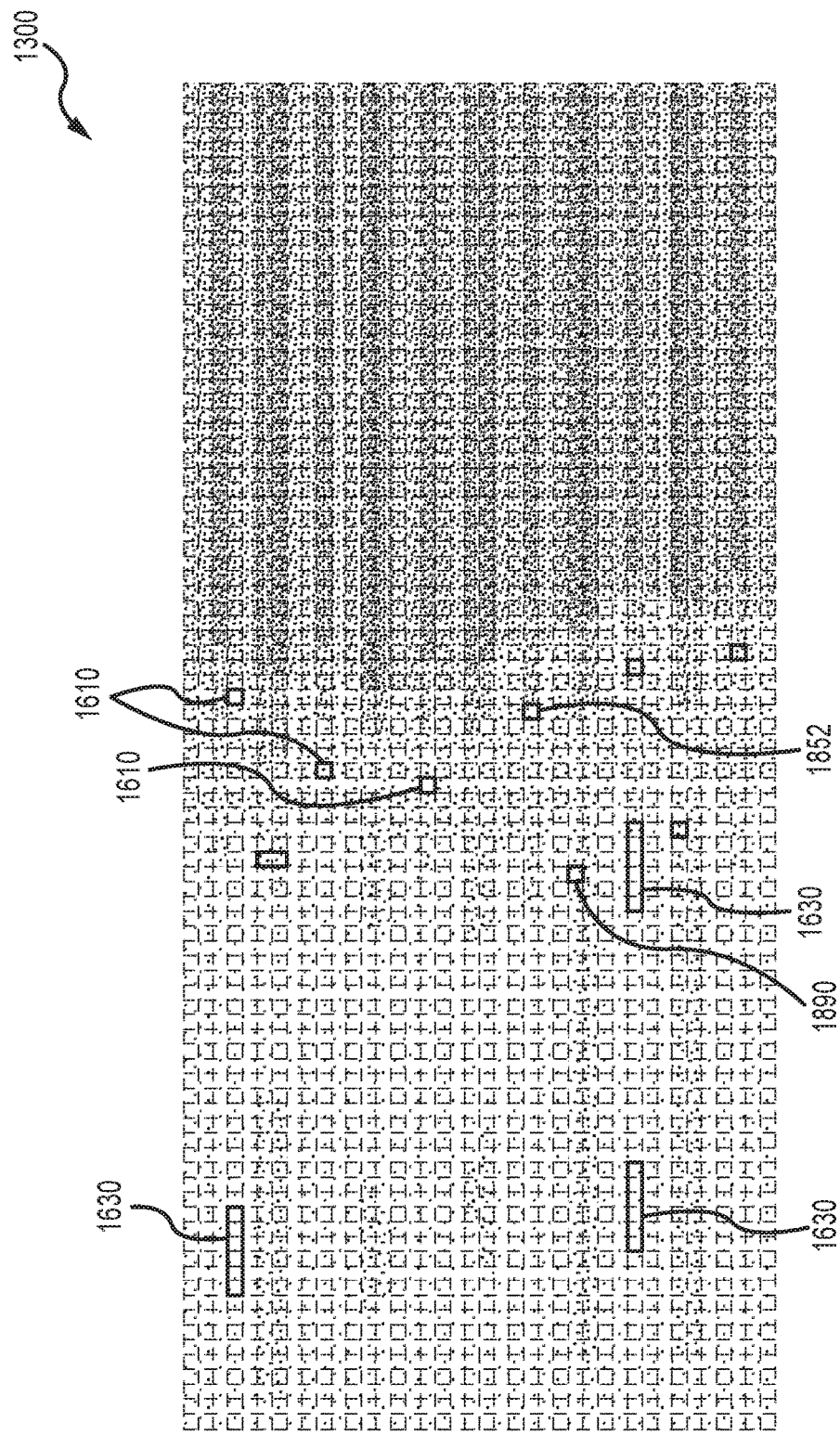
FIG. 19 illustrates the simulation grid of FIG. 13 after all nozzles have been simulated for up to 5/6 of availability of spraying.

FIG. 19 illustrates the simulation grid 1300 after all nozzles have been simulated for up to 5/6 of availability of spraying (with valves not being moved up to higher levels if over irrigation occurs). The simulated application grid 1300, which may not be wholly clear from FIG. 19, shows varying depth with each of the grid cells recording the depth of application received and many of these values differing from each other (e.g., attempting to match the prescription depths in cells of the prescription grid). However, it will be remembered that at the end of the 4/6 simulation (in this working example) each of the cells 1310 has equal application depths recorded. Symbols/square boundaries 1610, 1852 show that the pattern generation module acts to record where each of the nozzles is located (nozzle positions) when it is allowed to increase to the fifth level.

Figure 20:
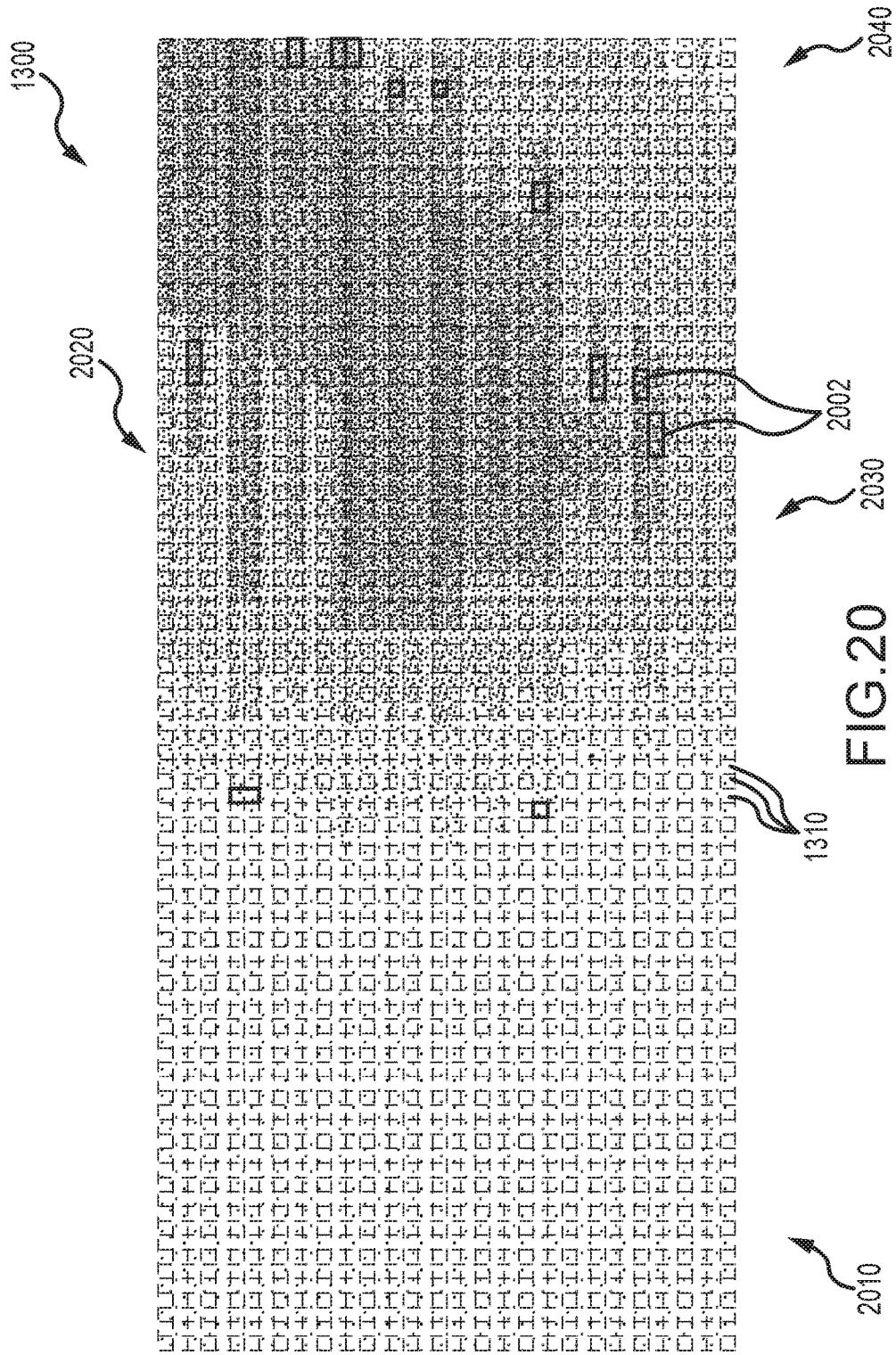
FIG. 20 illustrates the simulation grid after full simulation is completed for all nozzles.

This process is now repeated to the sixth level of availability, i.e., a nozzle being allowed to spray all the time in the corner arm. Nozzles are only considered for the sixth level in positions/nozzle locations where they were previously determined to be allowed to spray at the fifth level. FIG. 20 illustrates the simulation grid 1300 after the sixth level is fully simulated. In this working example, variation in the application depth across the strip of land has occurred or been achieved as can be seen for areas or zones 2010, 2020, 2030, 2040 each having a plurality of grid cells 1310 and with cells 2002 being over irrigated. Zone 2010 in simulation grid 1300 roughly corresponds in size and shape with zone 1310 of prescription grid 1300 while zone 2020 corresponds with zone 1320, zone 2030 corresponds with zone 1330, and zone 2040 corresponds with zone 1340. Contrast in application depths between the zones (e.g., zone 2010 and zone 2020) has been softened (when compared with the larger differences between zone 1310 and zone 1320) as lower levels of application in the prescription grid 1300 are given priority in this working example over higher levels (e.g., to avoid over irrigation). This means that the actual outcome of an irrigation event will apply less substance for a few meters over the deeper application side of each boundary between application depth zones in the simulation grid.

Further examples of such softening of depth contrasts could be provided. For example, the softening of zone edges could be where two zones abut with a clear straight line between two bordering/neighboring zones in a prescription grid (i.e., the boundary between two prescription zones appears as a solid line in the prescription grid). Simulation, however, will produce a simulation grid in which the edge/boundary between these two application depth zones is much less clear as the grid cells in the simulation grid near the boundary between two zones will experience a variance from the prescription. Particularly, when the nozzles of the corner arm move from a lower depth zone to a higher depth of application zone, the grid cells at or near the boundary will be under irrigated (relative to the prescribed depths) to avoid over irrigating the grid cells in the prior zone. Typically, this area of under watering in a zone will be relatively small, though, such as being the radius of the nozzle's coverage area. Also, the simulation process may be configured to allow some amounts of over irrigation such as by allowing some number of grids to be over irrigated (e.g., 3 or less grids in the above examples) or by allowing some overage (e.g., 0.1 mm being accepted when grid cells are prescribed to depths from 3.3 to 5 mm or the like).

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

I claim:

1. A center pivot irrigation system adapted for variable depth application, comprising:
    a pivot sprinkler arm comprising with a first set of spaced apart nozzles;
    a plurality of towers supporting the pivot sprinkler arm;
    drives on the plurality of towers operable to drive wheels on the plurality of towers to rotate the pivot sprinkler arm about a center pivot axis;
    a water supply providing input water to the pivot sprinkler arm;
    a first set of control valves each provided on the pivot sprinkler arm upstream of one of the first set of spaced apart nozzles;
    a corner sprinkler arm pivotally coupled to an end of the pivot sprinkler arm distal to the center pivot axis, wherein the corner sprinkler arm includes a second set of spaced apart nozzles, a corner arm tower supporting the corner sprinkler arm with a drive on the corner arm tower to drive wheels on the corner arm tower to selectively place the corner sprinkler arm in a trailing position, in an extended position, and positions between the trailing position and the extended position, and a second set of control valves each provided on the corner sprinkler arm upstream of one of the second set of spaced apart nozzles;
    a controller transmitting control signals to the first and second sets of control valves to open and close in a pattern defined by a valve pulsing pattern for the pivot sprinkler arm and a valve pulsing pattern for the corner sprinkler arm, wherein a subset of nozzles from the first and second sets of spaced apart nozzles discharges the input water and wherein during a full pivot of the pivot sprinkler arm the first set of spaced apart nozzles apply a substantially uniform depth of the input water and the second set of spaced apart nozzles apply the input water at two or more differing depths; and
    a location monitor periodically determining a bearing of the pivot sprinkler arm,
    wherein the valve pulsing pattern for the corner sprinkler arm is selected by the controller based on the bearing of the pivot sprinkler arm,
    wherein the valve pulsing pattern for the corner sprinkler arm is selected based on the bearing from a plurality of differing predefined open and closed patterns for valves on the corner sprinkler arm each associated with a different bearing of the pivot sprinkler arm, and
    wherein the plurality of differing predefined open and closed patterns for the valves on the corner sprinkler arm are generated from a simulation of travel of the corner sprinkler arm over a field during irrigation operations of the field, wherein the two or more application depth prescription zones correspond to areas of the field, and wherein the simulation includes measuring application of water from the corner pivot arm into a plurality of grid areas and comparing the measured application of water in the grid areas with a goal depth of irrigation assigned to grid areas in a prescription grid including the application depth prescription zones.

2. The system of claim 1, wherein the measuring of application of water includes accounting for overlapping coverage areas for the nozzles, wherein the control valves for the nozzles are controlled to avoid over irrigating based on results of the comparing step, and wherein the simulation includes performing irrigation at each new pivot location allowing the nozzles to apply greater fractions relative to a continuously open state.

3. An irrigation system adapted for variable depth application with a corner sprinkler arm, comprising:
    a pivot sprinkler arm pivotable about a center pivot axis;
    a corner sprinkler arm coupled to an end of the pivot sprinkler arm and pivotable between a trailing position and an extended position during rotation of the pivot sprinkler arm about the center pivot axis, wherein the corner sprinkler arm includes a set of nozzles and further includes a set of valves each separately operable and provided on the corner sprinkler arm upstream of a nozzle in the set of nozzles;
    a controller transmitting control signals to the set of valves to independently pulse open or closed each of the valves according to a pattern defined in a valve pulsing pattern for the corner sprinkler arm, whereby a subset of the nozzles in the set of space apart nozzles discharges water input into the corner sprinkler arm from the pivot sprinkler arm; and
    a location monitor periodically transmitting location data to the controller,
    wherein the controller processes the location data to determine a bearing of the pivot sprinkler arm,
    wherein the valve pulsing pattern for the corner sprinkler arm is selected by the controller from a plurality of differing open and closed patterns based on the determined bearing of the pivot sprinkler arm to apply at least two differing depths of substance to land under the corner sprinkler arm during pivoting of the pivot sprinkler arm about the center pivot axis,
    wherein the plurality of differing open and closed patterns are each associated with a unique location of the pivot sprinkler arm in a field being irrigated during operations of the irrigation system,
    wherein the unique locations of the pivot sprinkler arm correspond with the corner sprinkler arm being positioned over two or more zones in the land associated with one of the at least two differing depths, and
    wherein the plurality of differing open and closed patterns are generated using a simulation of irrigating of the land that includes performing a plurality of pivots of the pivot sprinkler arm at increasing nozzle availabilities with comparison of measured application depths in cells of a prescription grid corresponding with the land with peer cells of a prescription grid defining a target application depth for each of the peer cells.

4. The system of claim 3, wherein the plurality of differing open and closed patterns are adapted to provide a uniform application of water from the set of nozzles as the pivot sprinkler arm rotates about the center pivot axis, wherein the plurality of differing open and closed patterns for the valves are generated from a simulation of travel of the pivot sprinkler arm and the corner sprinkler arm during irrigation operations of a field, and wherein the simulation includes measuring application of water from both the pivot sprinkler arm and the corner pivot arm into a plurality of grid areas and comparing the measured application of water in the grid areas with a goal depth of irrigation for the field.

5. The system of claim 1, wherein the plurality of differing predefined open and closed patterns for the valves on the corner sprinkler arm are adapted to provide a variable depth application of the input water from the second set of spaced apart nozzles of the corner sprinkler arm as the pivot sprinkler arm rotates about the center pivot axis with the water supply providing the input water and is positioned over two or more areas of the field mapped to application depth prescription zones.

6. A center pivot irrigation system adapted for variable depth application, comprising:
   a pivot sprinkler arm comprising with a first set of spaced apart nozzles and rotatable about a center pivot axis;
   a first set of control valves each provided on the pivot sprinkler arm upstream of one of the first set of spaced apart nozzles;
   a corner sprinkler arm pivotally coupled to an end of the pivot sprinkler arm distal to the center pivot axis, wherein the corner sprinkler arm includes a second set of spaced apart nozzles, a corner arm tower supporting the corner sprinkler arm with a drive on the corner arm tower to drive wheels on the corner arm tower to selectively place the corner sprinkler arm in a trailing position, in an extended position, and positions between the trailing position and the extended position, and a second set of control valves each provided on the corner sprinkler arm upstream of one of the second set of spaced apart nozzles;
   a controller transmitting control signals to the first and second sets of control valves to open and close in a pattern defined by a valve pulsing pattern for the pivot sprinkler arm and a valve pulsing pattern for the corner sprinkler arm, wherein a subset of the nozzles in the first and second sets of spaced apart nozzles discharges input water and wherein during a full pivot of the pivot sprinkler arm the nozzles in the first set of spaced apart nozzles apply a substantially uniform depth of the input water and the nozzles in the second set of spaced apart nozzles apply the input water at two or more differing depths; and
   a location monitor periodically determining a bearing of the pivot sprinkler arm,
   wherein the valve pulsing pattern for the corner sprinkler arm is selected by the controller based on the bearing of the pivot sprinkler arm,
   wherein the valve pulsing pattern for the corner sprinkler arm is selected based on the bearing from a plurality of differing predefined open and closed patterns for valves on the corner sprinkler arm each associated with a different bearing of the pivot sprinkler arm, and
   wherein the plurality of differing predefined open and closed patterns for the valves on the corner sprinkler arm are generated from a simulation of travel of the corner sprinkler arm over a field during irrigation operations of the field, wherein the two or more application depth prescription zones correspond to areas of the field, and wherein the simulation includes measuring application of water from the corner pivot arm into a plurality of grid areas and comparing the measured application of water in the grid areas with a goal depth of irrigation assigned to grid areas in a prescription grid including the application depth prescription zones.

7. The system of claim 6, wherein the measuring of application of water includes accounting for overlapping coverage areas for the nozzles.

8. The system of claim 6, wherein the control valves for the nozzles are controlled to avoid over irrigating based on results of the comparing step.

9. The system of claim 6, wherein the simulation includes performing irrigation at each new pivot location allowing the nozzles to apply greater fractions relative to a continuously open state.

10. The system of claim 6, wherein the plurality of differing predefined open and closed patterns for the valves on the corner sprinkler arm are adapted to provide a variable depth application of the input water from the second set of spaced apart nozzles of the corner sprinkler arm as the pivot sprinkler arm rotates about the center pivot axis with the water supply providing the input water and is positioned over two or more areas of the field mapped to application depth prescription zones.

* * * * *